(12) United States Patent
Stevens et al.

(10) Patent No.: US 9,886,241 B2
(45) Date of Patent: Feb. 6, 2018

(54) MANAGING INTERFACES FOR SUB-GRAPHS

(71) Applicant: Ab Initio Technology LLC, Lexington, MA (US)

(72) Inventors: Daniell Garrick Stevens, Belmont, MA (US); Tsvetan Tsvetanov, Waltham, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 14/561,494

(22) Filed: Dec. 5, 2014

(65) Prior Publication Data

US 2015/0160927 A1 Jun. 11, 2015

Related U.S. Application Data

(60) Provisional application No. 61/912,057, filed on Dec. 5, 2013, provisional application No. 62/031,388, filed on Jul. 31, 2014.

(51) Int. Cl.
G06F 9/44 (2006.01)

(52) U.S. Cl.
CPC . *G06F 8/10* (2013.01); *G06F 8/34* (2013.01)

(58) Field of Classification Search
CPC .... G06F 9/4436; G06F 9/30058; G06F 13/00; G06F 17/30516; G06F 8/4452; G06F 9/46

(Continued)

(56) References Cited

U.S. PATENT DOCUMENTS 3,662,343 A 5/1972 Goldstein et al.
3,662,401 A 5/1972 Collins et al.

(Continued)

FOREIGN PATENT DOCUMENTS

AU 2014262225 12/2014
EP 0834810 4/1998

(Continued)

OTHER PUBLICATIONS

Babaoglu, O et al., "Mapping parallel computations onto distributed systems in Paralex" Compuero '91. Advanced Computer Technology, Reliable Systems and Applications. 5th Annual European Computer Conference. Proceedings. Bologna, Italy May 13-16, 1991, Los Alamitos, CA, USA, IEEE Comput. Soc, US, May 13, 1991, pp. 123-130.

(Continued)

*Primary Examiner* — Ryan Coyer
*Assistant Examiner* — Daniel Wei
(74) *Attorney, Agent, or Firm* — Occhiuti & Rohlicek LLP

(57) ABSTRACT

Specifying a dataflow graph includes: rendering, in a first user interface, a representation of a first dataflow graph. At least one component represents a computation associated with at least one of data flowing into an input port or data flowing out of an output port. A link between components is rendered based on user input indicating a flow of data. In a second user interface, a representation of a sub-graph of the first dataflow graph is rendered. A first flow junction represents a connection between: (1) a flow of data outside the sub-graph interface, and (2) a flow of data inside the sub-graph interface. A link is rendered between the first flow junction and a second flow junction based on user input indicating a relationship between a first descriptor and a second descriptor.

51 Claims, 13 Drawing Sheets

(58) Field of Classification Search
USPC .................................................. 717/105–114
See application file for complete search history.

(56) References Cited

U.S. PATENT DOCUMENTS

| | | | |
|---|---|---|---|
| 4,228,496 A | 10/1980 | Katzman et al. |
| 4,922,418 A | 5/1990 | Dolecek |
| 4,972,314 A | 11/1990 | Getzinger et al. |
| 5,127,104 A | 6/1992 | Dennis |
| 5,276,899 A | 1/1994 | Neches |
| 5,280,619 A | 1/1994 | Wang |
| 5,301,336 A | 4/1994 | Kodosky |
| 5,323,452 A | 6/1994 | Dickman et al. |
| 5,333,319 A | 7/1994 | Silen |
| 5,357,632 A | 10/1994 | Pian et al. |
| 5,495,590 A | 2/1996 | Comfort et al. |
| 5,504,900 A | 4/1996 | Raz |
| 5,630,047 A | 5/1997 | Wang |
| 5,692,168 A | 11/1997 | McMahan |
| 5,701,400 A | 12/1997 | Amardo |
| 5,712,971 A | 1/1998 | Stanfill et al. |
| 5,745,778 A | 4/1998 | Alfieri |
| 5,799,266 A | 8/1998 | Hayes |
| 5,802,267 A | 9/1998 | Shirakihara et al. |
| 5,805,462 A | 9/1998 | Poirot et al. |
| 5,857,204 A | 1/1999 | Lordi et al. |
| 5,923,832 A | 7/1999 | Shirakihara et al. |
| 5,924,095 A | 7/1999 | White |
| 5,930,794 A | 7/1999 | Linenbach et al. |
| 5,933,640 A | 8/1999 | Dion |
| 5,966,072 A | 10/1999 | Stanfill et al. |
| 5,999,729 A | 12/1999 | Tabloski, Jr. et al. |
| 6,006,242 A | 12/1999 | Poole et al. |
| 6,012,094 A | 1/2000 | Leyman |
| 6,014,670 A | 1/2000 | Zamanian et al. |
| 6,016,516 A | 1/2000 | Horikiri |
| 6,032,158 A | 2/2000 | Mukhopadhhyay et al. |
| 6,038,558 A | 3/2000 | Powers et al. |
| 6,044,211 A | 3/2000 | Jain |
| 6,044,374 A | 3/2000 | Nesamoney et al. |
| 6,044,394 A | 3/2000 | Cadden et al. |
| 6,088,716 A | 7/2000 | Stanfill et al. |
| 6,145,017 A | 11/2000 | Ghaffari |
| 6,173,276 B1 | 1/2001 | Kant et al. |
| 6,208,345 B1 | 3/2001 | Sheard et al. |
| 6,256,637 B1 | 7/2001 | Venkatesh et al. |
| 6,259,988 B1 | 7/2001 | Galkowski et al. |
| 6,272,650 B1 | 8/2001 | Meyer et al. |
| 6,301,601 B1 | 10/2001 | Helland |
| 6,314,114 B1 | 11/2001 | Coyle et al. |
| 6,324,437 B1 | 11/2001 | Frankel et al. |
| 6,330,008 B1 | 12/2001 | Razdow et al. |
| 6,332,212 B1 | 12/2001 | Organ et al. |
| 6,339,775 B1 | 1/2002 | Zamanian et al. |
| 6,400,996 B1 | 6/2002 | Hoffberg et al. |
| 6,401,216 B1 | 6/2002 | Meth et al. |
| 6,437,796 B2 | 8/2002 | Sowizral et al. |
| 6,449,711 B1 | 9/2002 | Week |
| 6,480,876 B2 | 11/2002 | Rehg et al. |
| 6,496,961 B2 | 12/2002 | Gupta et al. |
| 6,538,651 B1 | 3/2003 | Hayman et al. |
| 6,584,581 B1 | 6/2003 | Bay et al. |
| 6,608,628 B1 | 8/2003 | Ross et al. |
| 6,611,862 B2 | 8/2003 | Reisman |
| 6,651,234 B2 | 11/2003 | Gupta et al. |
| 6,654,907 B2 | 11/2003 | Stanfill et al. |
| 6,658,464 B2 | 12/2003 | Reisman |
| 6,715,145 B1 | 3/2004 | Bowman-Amuah |
| 6,728,879 B1 | 4/2004 | Atkinson |
| 6,760,903 B1 | 7/2004 | Morshed et al. |
| 6,813,761 B1 | 11/2004 | Das et al. |
| 6,816,825 B1 | 11/2004 | Ashar et al. |
| 6,832,369 B1 | 12/2004 | Kryka et al. |
| 6,848,100 B1 | 1/2005 | Wu et al. |
| 6,879,946 B2 | 4/2005 | Rong et al. |
| 7,062,483 B2 | 6/2006 | Ferrari et al. |
| 7,082,604 B2 | 7/2006 | Schneiderman |
| 7,085,426 B2 | 8/2006 | August |
| 7,103,597 B2 | 9/2006 | McGovern |
| 7,103,620 B2 | 9/2006 | Kunz et al. |
| 7,130,484 B2 | 10/2006 | August |
| 7,137,116 B2 | 11/2006 | Parkes et al. |
| 7,164,422 B1 | 1/2007 | Wholey et al. |
| 7,165,030 B2 | 1/2007 | Yi et al. |
| 7,167,850 B2 | 1/2007 | Stanfill |
| 7,316,001 B2 | 1/2008 | Gold et al. |
| 7,356,819 B1 | 4/2008 | Ricart et al. |
| 7,398,514 B2 | 7/2008 | Ulrich et al. |
| 7,412,658 B2 | 8/2008 | Gilboa |
| 7,417,645 B2 | 8/2008 | Beda et al. |
| 7,457,984 B2 | 11/2008 | Kutan |
| 7,467,383 B2 | 12/2008 | Inchingolo et al. |
| 7,505,975 B2 | 3/2009 | Luo |
| 7,577,628 B2 | 8/2009 | Stanfill |
| 7,594,220 B2 * | 9/2009 | Kodosky et al. ............. 717/125 |
| 7,636,699 B2 | 12/2009 | Stanfill |
| 7,716,630 B2 | 5/2010 | Wholey et al. |
| 7,840,949 B2 | 11/2010 | Schumacher et al. |
| 7,870,556 B2 | 1/2011 | Wholey et al. |
| 7,877,350 B2 | 1/2011 | Stanfill et al. |
| 8,281,297 B2 | 10/2012 | Dasu |
| 8,396,886 B1 | 3/2013 | Tsimelzon et al. |
| 8,429,631 B2 | 4/2013 | Schumacher et al. |
| 8,566,641 B2 | 10/2013 | Douros et al. |
| 2001/0055019 A1 | 12/2001 | Sowizral et al. |
| 2002/0080181 A1 | 6/2002 | Razdow et al. |
| 2002/0087921 A1 | 7/2002 | Rodriguez |
| 2002/0091747 A1 | 7/2002 | Rehg et al. |
| 2002/0091748 A1 | 7/2002 | Rehg et al. |
| 2002/0111876 A1 | 8/2002 | Rudraraju et al. |
| 2002/0129340 A1 | 9/2002 | Tuttle |
| 2002/0147745 A1 | 10/2002 | Houben et al. |
| 2002/0184616 A1 | 12/2002 | Chessell et al. |
| 2003/0004771 A1 | 1/2003 | Yaung |
| 2003/0016246 A1 | 1/2003 | Singh |
| 2003/0023413 A1 | 1/2003 | Srinivasa |
| 2003/0033432 A1 | 2/2003 | Simpson et al. |
| 2003/0091055 A1 | 5/2003 | Craddock et al. |
| 2003/0126240 A1 | 7/2003 | Vosseler |
| 2003/0204804 A1 | 10/2003 | Petri et al. |
| 2004/0006745 A1 | 1/2004 | Van Heldan et al. |
| 2004/0041838 A1 | 3/2004 | Adusumilli et al. |
| 2004/0073529 A1 | 4/2004 | Stanfill |
| 2004/0093559 A1 | 5/2004 | Amaru et al. |
| 2004/0098452 A1 | 5/2004 | Brown et al. |
| 2004/0107414 A1 | 6/2004 | Bronicki et al. |
| 2004/0111469 A1 | 6/2004 | Manion et al. |
| 2004/0148373 A1 | 7/2004 | Childress et al. |
| 2004/0177099 A1 | 9/2004 | Ganesh et al. |
| 2004/0205726 A1 | 10/2004 | Chedgey et al. |
| 2004/0207665 A1 | 10/2004 | Mathur |
| 2004/0210831 A1 | 10/2004 | Feng et al. |
| 2004/0225657 A1 | 11/2004 | Sarkar |
| 2004/0260590 A1 | 12/2004 | Golani et al. |
| 2005/0021689 A1 | 1/2005 | Marvin et al. |
| 2005/0033720 A1 | 2/2005 | Verma et al. |
| 2005/0034112 A1 | 2/2005 | Stanfill |
| 2005/0039176 A1 | 2/2005 | Fournie |
| 2005/0059046 A1 | 3/2005 | Labrenz et al. |
| 2005/0086360 A1 | 4/2005 | Mamou et al. |
| 2005/0097515 A1 | 5/2005 | Ribling |
| 2005/0097561 A1 | 5/2005 | Schumacher et al. |
| 2005/0102670 A1 | 5/2005 | Bretl et al. |
| 2005/0144277 A1 | 6/2005 | Flurry et al. |
| 2005/0144596 A1 | 6/2005 | McCullough et al. |
| 2005/0149935 A1 | 7/2005 | Benedetti |
| 2005/0172268 A1 | 8/2005 | Kuturiano et al. |
| 2005/0177531 A1 | 8/2005 | Bracewell |
| 2005/0193056 A1 | 9/2005 | Schaefer et al. |
| 2005/0216421 A1 | 9/2005 | Barry et al. |
| 2005/0240621 A1 | 10/2005 | Robertson et al. |
| 2005/0262470 A1 | 11/2005 | Gavrilov |
| 2005/0289527 A1 | 12/2005 | Illowsky et al. |
| 2006/0085462 A1 | 4/2006 | Todd |

(56) References Cited

U.S. PATENT DOCUMENTS

| | | |
|---|---|---|
| 2006/0095722 A1 | 5/2006 | Biles et al. |
| 2006/0098017 A1 | 5/2006 | Tarditi et al. |
| 2006/0130041 A1 | 6/2006 | Pramanick et al. |
| 2006/0190105 A1 | 8/2006 | Hsu et al. |
| 2006/0206872 A1 | 9/2006 | Krishnaswamy |
| 2006/0282474 A1 | 12/2006 | MacKinnon |
| 2006/0294150 A1* | 12/2006 | Stanfill et al. ............... 707/200 |
| 2006/0294459 A1 | 12/2006 | Davis et al. |
| 2007/0011668 A1 | 1/2007 | Wholey et al. |
| 2007/0022077 A1 | 1/2007 | Stanfill |
| 2007/0035543 A1 | 2/2007 | David et al. |
| 2007/0094211 A1 | 4/2007 | Sun et al. |
| 2007/0118839 A1 | 5/2007 | Berstis et al. |
| 2007/0139441 A1 | 6/2007 | Lucas et al. |
| 2007/0143360 A1 | 6/2007 | Harris et al. |
| 2007/0150429 A1 | 6/2007 | Huelsman et al. |
| 2007/0174185 A1 | 7/2007 | McGovern |
| 2007/0179923 A1 | 8/2007 | Stanfill |
| 2007/0198971 A1 | 8/2007 | Dasu |
| 2007/0239766 A1 | 10/2007 | Papaefstathiou et al. |
| 2007/0271381 A1 | 11/2007 | Wholey et al. |
| 2007/0271562 A1 | 11/2007 | Schumacher et al. |
| 2007/0279494 A1 | 12/2007 | Aman et al. |
| 2007/0285440 A1 | 12/2007 | MacInnis et al. |
| 2008/0049022 A1 | 2/2008 | Sherb et al. |
| 2008/0126755 A1 | 5/2008 | Wu et al. |
| 2008/0134138 A1 | 6/2008 | Chamieh |
| 2008/0244524 A1 | 10/2008 | Kelso |
| 2008/0250049 A1 | 10/2008 | Chakra et al. |
| 2008/0288608 A1 | 11/2008 | Johnson |
| 2008/0288856 A1* | 11/2008 | Goranson ........... G06F 17/2235 715/208 |
| 2008/0294615 A1 | 11/2008 | Furuya et al. |
| 2009/0030863 A1 | 1/2009 | Stanfill et al. |
| 2009/0064147 A1 | 3/2009 | Beckerle et al. |
| 2009/0083313 A1 | 3/2009 | Stanfill et al. |
| 2009/0113196 A1 | 4/2009 | Jan et al. |
| 2009/0182728 A1 | 7/2009 | Anderson |
| 2009/0193391 A1 | 7/2009 | Miller et al. |
| 2009/0193417 A1 | 7/2009 | Kahlon |
| 2009/0224941 A1 | 9/2009 | Kansal et al. |
| 2009/0235267 A1 | 9/2009 | McKinney et al. |
| 2009/0245426 A1 | 10/2009 | Ratnaker et al. |
| 2009/0313625 A1 | 12/2009 | Sharoff |
| 2009/0327196 A1 | 12/2009 | Studer et al. |
| 2010/0042976 A1 | 2/2010 | Hines |
| 2010/0070955 A1 | 3/2010 | Kahlon |
| 2010/0169137 A1 | 7/2010 | Jastrebski et al. |
| 2010/0174694 A1 | 7/2010 | Staebler et al. |
| 2010/0180344 A1 | 7/2010 | Malyshev et al. |
| 2010/0211953 A1 | 8/2010 | Wakeling et al. |
| 2010/0218031 A1 | 8/2010 | Agarwal et al. |
| 2010/0281462 A1 | 11/2010 | Festa |
| 2010/0281488 A1 | 11/2010 | Krishnamurthy et al. |
| 2011/0078500 A1 | 3/2011 | Douros et al. |
| 2011/0093433 A1 | 4/2011 | Stanfill et al. |
| 2011/0179014 A1 | 7/2011 | Schechter et al. |
| 2011/0307897 A1* | 12/2011 | Atterbury et al. ............ 718/102 |
| 2012/0023508 A1 | 1/2012 | Flores et al. |
| 2012/0036498 A1 | 2/2012 | Akirekadu et al. |
| 2012/0054255 A1 | 3/2012 | Buxbaum |
| 2012/0102029 A1* | 4/2012 | Larson ...................... G06F 8/34 707/736 |
| 2012/0151419 A1 | 6/2012 | Kent et al. |
| 2012/0216176 A1 | 8/2012 | Gaikwad et al. |
| 2012/0222017 A1 | 8/2012 | Hinkle et al. |
| 2012/0233599 A1 | 9/2012 | Valdiviezo et al. |
| 2012/0266074 A1 | 10/2012 | Bhoovaraghavan et al. |
| 2012/0284255 A1 | 11/2012 | Schechter et al. |
| 2013/0124392 A1 | 5/2013 | Achanta et al. |
| 2013/0167241 A1 | 6/2013 | Siman |
| 2013/0239089 A1 | 9/2013 | Eksten et al. |
| 2013/0290928 A1 | 10/2013 | Johnson |
| 2014/0068566 A1 | 3/2014 | Coronado et al. |
| 2014/0143760 A1 | 5/2014 | Buxbaum et al. |
| 2015/0160926 A1 | 6/2015 | Larson et al. |

FOREIGN PATENT DOCUMENTS

| | | |
|---|---|---|
| JP | 64-013189 | 1/1989 |
| JP | H01-094431 | 4/1989 |
| JP | 06-236276 | 8/1994 |
| JP | H08-106540 | 4/1996 |
| JP | 08-278892 | 10/1996 |
| JP | 08-305576 | 11/1996 |
| JP | 63-231613 | 9/1998 |
| JP | 11-184766 | 7/1999 |
| JP | 2000-010788 | 1/2000 |
| JP | 2000-99317 | 4/2000 |
| JP | 2000-514219 | 10/2000 |
| JP | 2001-022571 | 1/2001 |
| JP | 2006-504160 | 2/2006 |
| JP | 2006-133986 | 5/2006 |
| WO | WO 98/00791 | 1/1998 |
| WO | WO 2002/011344 | 2/2002 |
| WO | WO 2005/001687 | 1/2005 |
| WO | WO 2005/086906 | 9/2005 |
| WO | WO 2008/124319 | 10/2008 |
| WO | WO 2009/039352 | 3/2009 |
| WO | 2014/011708 | 1/2014 |

OTHER PUBLICATIONS

Baer, J.L. et al., "Legality and Other Properties of Graph Models of Computations." Journal of the Association for Computing Machinery, vol. 17, No. 3, Jul. 1970, pp. 543-554.

Bookstein, A. et al., "Modeling Word Occurrences for the Compression of Concordances." ACM Transactions on Information Systems, vol. 15, No. 3, Jul. 1997, pp. 254-290.

Burch, J.R. et al., "Sequential circuit verification using symbolic model checking." In Design Automation Conference, 1990, Proceedings of the $27^{th}$ ACM/IEEE. Jun. 24-28, 1990, pp. 46-51.

Control-M; New Dimension Software. User Manual. New Dimension Software Ltd., 1999.

Cytron, Ron et al., "Efficiently Computing Static Single Assignment Form and the Control Dependence Graph." ACM Transactions on Programming Languages and Systems, vol. 13, No. 4, Oct. 1991, pp. 451-490.

Ebert, Jurgen et al., "A Declarative Approach to Graph-Based Modeling." Workshop on Graph-Theoretic Concepts in Computer Science, 1994, pp. 1-19.

European Search Report issued in application No. EP10003554, dated Sep. 24, 2010, 7 pages.

Gamma et al. "Design Patterns: Elements of Reusable Object-Oriented Software", Sep. 1999.

Guyer et al., "Finding Your Cronies: Static Analysis for Dynamic Object Colocation." Oct. 2004, ACM, pp. 237-250.

Grove et al., "A Framework for Call Graph Construction Algorithms." Nov. 2001, ACM TOPLAS, vol. 23, Issue 6, pp. 685-746.

Herniter, Marc E., "Schematic Capture with MicroSim PSpice," $2^{nd}$ Edition, Prentice Hall, Upper Saddle River, N.J., 1996, pp. 51-52, 255-280, 292-297.

International Search Report & Written Opinion issued in PCT application No. PCT/US01/23552, dated Jan. 24, 2002, 5 pages.

International Search Report & Written Opinion issued in PCT application No. PCT/US06/24957, dated Jan. 17, 2008, 14 pages.

International Search Report & Written Opinion issued in PCT application No. PCT/US07/75576, dated Sep. 16, 2008, 13 pages.

International Search Report & Written Opinion issued in PCT application No. PCT/US08/71206, dated Oct. 22, 2008, 12 pages.

International Search Report & Written Opinion issued in PCT application No. PCT/US10/49966, dated Nov. 23, 2010, 8 pages.

International Search Report & Written Opinion received in PCT application No. PCT/US10/24036, dated Mar. 23, 2010, 11 pages.

International Search Report & Written Opinion received in PCT application No. PCT/US2011/040440, dated Oct. 12, 2011, 13 pages.

(56) References Cited

OTHER PUBLICATIONS

International Search Report & Written Opinion received in PCT application No. PCT/US2013/076416, dated Apr. 9, 2014, 10 pages.
Jawadi, Ramamohanrao et al., "A Graph-based Transaction Model for Active Databases and its Parallel Implementation." U. Florida Tech. Rep TR94-0003, 1994, pp. 1-29.
Just et al., "Review and Analysis of Synthetic Diversity for Breaking Monocultures." Oct. 2004, ACM, pp. 23-32.
Kebschull, U. et al., "Efficient Graph-Based Computation and Manipulation of Functional Decision Diagrams." University of Tubingen, 1993 IEEE, pp. 278-282.
Krahmer et al., "Graph-Based Generation of Referring Expressions." Mar. 2003, MIT Press, vol. 29, No. 1, pp. 53-72.
Krsul, Ivan et al., "VMPlants: Providing and Managing Virtual Machine Execution Environments for Grid Computing." Proceedings of the ACM/IEEE SC2004 Conference on Supercomputing, 2001, Nov. 6-12, 2004, 12 pages.
Li, Xiqing et al., "A Practical External Sort for Shared Disk MPPs." Proceedings of Supercomputing '93, 1993, 24 pages.
Martin, David et al., "Models of Computations and Systems—Evaluation of Vertex Probabilities in Graph Models of Computations." Journal of the Association for Computing Machinery, vol. 14, No. 2, Apr. 1967, pp. 281-299.
Ou, Chao-Wei et al., "Architecture-Independent Locality—Improving Transformations of Computational Graphs Embedded in k-Dimensions." Proceedings of the $9^{th}$ International Conference on Supercomputing, 1995, pp. 289-298.
"RASSP Data Flow Graph Design Application Note." International Conference on Parallel Processing, Dec. 2000, Retrieved from Internet <http://www.atl.external.lmco.com/projects/rassp/RASSP_legacy/appnotes/FLOW/APNOTE_FLOW_02 >, 5 pages.
Romberg, M., "UNICORE: Beyond Web-based Job-Submission," Proceedings of the 42nd Cray User Group Conference, Noordwijk (May 22-26, 2000).
Stanfill, Craig, "Massively Parallel Information Retrieval for Wide Area Information Servers." 1991 IEEE International Conference on Systems, Man and Cybernetics, Oct. 1991, pp. 679-682.
Stanfill, Craig et al., "Parallel Free-Text Search on the Connection Machine System." Communications of the ACM, vol. 29, No. 12, Dec. 1986, pp. 1229-1239.
Stanfill, Craig, "The Marriage of Parallel Computing and Information Retrieval." IEE Colloquium on Parallel Techniques for Information Retrieval, Apr. 1989, 5 pages.
Supplemental European Search Report issued in application No. EP07813940, dated Nov. 26, 2009, 7 pages.
Supplemental European Search Report issued in application No. EP08796632, dated Sep. 24, 2010, 6 pages.
"Unicenter AutoSys Job Management," Computer Associates, Copyright 2001.
Vajracharya, Suvas et al., "Asynchronous Resource Management." Proceedings of the $15^{th}$ International Parallel and Distributed Processing Symposium, Apr. 2001, 10 pages.
"Visual Lint: Squash Bugs Early with Interactive C/C++, C# and Java Code Analysis for Microsoft Visual Studio and Eclipse," [ retrieved from the internet Dec. 3, 2012: www.riverblade.co.uk/products/visual_lint.] (2 pages).
Wah, B.W. et al., "Report on Workshop on High Performance Computing and Communications for Grand Challenge Applications: Computer Vision, Speech and Natural Language Processing, and Artificial Intelligence." IEEE Transactions on Knowledge and Data Engineering, vol. 5, No. 1, Feb. 1993, 138-154.
Japanese Office Action, with English Translation, JP application No. 2011-000948, dated Jan. 8, 2013, 11 pages.
Supplemental European Search Report issued in application No. EP06774092, dated Dec. 19, 2012, 5 pages.
"Topological sorting," Wikipedia, accessed Dec. 10, 2012, 2 pages.
European Search Report issued in application No. EP10741775, dated Nov. 14, 2012, 4 pages.
Russell, Nick, et al., "Workflow Control-Flow Patterns A Revised View," Workflow Patterns Initiative, 2006, pp. 1-134.
van der Aalst, W.M.P., et al., "Workflow Patterns," Distributed and Parallel Databases, 14, 5-51, 2003.
Japanese Office Action, with English Translation, JP application No. 2009-523997, dated Oct. 23, 2012, 7 pages.
Japanese Office Action, with English Translation, JP application No. 2008-519474, dated Sep. 25, 2012, 8 pages.
Shoten, Iwanami, "Encyclopedic Dictionary of Computer Science," (with English Translation), May 25, 1990, p. 741.
Japanese Office Action, with English Translation, JP application No. 2010-518415, dated Feb. 21, 2013, 11 pages.
Dillon, Laura K., et al., "Inference Graphs: A Computational Structure Supporting Generation of Customizable and Correct Analysis Components," IEEE Transactions on Software Engineering, vol. 29, No. 2, Feb. 2003, pp. 133-150.
Evripidou, Paraskevas, et al., "Incorporating input/output operations into dynamic data-flow graphs," Parallel Computing 21 (1995) 1285-1311.
Extended European Search Report, EP 12165575, dated May 10, 2013, 9 pages.
Frankl, Phyllis G., et al., "An Applicable Family of Data Flow Testing Criteria," IEEE Transactions on Sofrware Engineering, vol. 14, No. 10, Oct. 1988, pp. 1483-1498.
Whiting, Paul G., et al., "A History of Data-Flow Languages," IEEE Annals of the History of Computing, vol. 16, No. 4, 1994, pp. 38-59.
European Examination Report issued in related EP Application No. 10 741 775.0 dated Jul. 7, 2014.
Mattson et al., "Patterns for Parallel Programming," Addison-Wesley Professional ISBN: 0-321-22811-1 (2004).
Rajesh K. Gupta and Giovanni de Micheli—"A co-synthesis approach to embedded system design automation" Design Automation for Embedded Systems, vol. 1, issue 1-2, 69-120.
Karasawa, K.; Iwata, M.; and Terada, H.—"Direct generation of data-driven program for stream-oriented processing"—Published in: Parallel Architctures and Compilation Techniques., 1997. Proceedings., 1997 International Conference on; Nov. 10-14, 1997 San Francisco, CA—pp. 295-306.
International Search Report and Written Opinion issued in PCT/US2016/045612, dated Jan. 13, 2017.
National Instruments LABVIEW User Manual, Apr. 2003 Edition National Instruments Corporation, Austin TX (349 pages).
"Modular programming" Wikipedia, retrieved Feb. 10, 2009 (2 pages).
"System integration" Wikipedia, retrieved Jan. 25, 2009 (3 pages).
U.S. Appl. No. 12/977,545, filed Dec. 23, 2010, Managing Metadata for Graph-Based Computations, now U.S. Pat. No. 8,484,159.
U.S. Appl. No. 11/836,349, filed Aug. 9, 2007, Distributing Services in Graph-Based Computations.
U.S. Appl. No. 12/180,141, filed Jul. 25, 2008, Transactional Graph-Based Computation With Error Handling.
U.S. Appl. No. 12/704,998, filed Feb. 12, 2010, Managing Task Execution.
U.S. Appl. No. 13/161,010, filed Jun. 15, 2011, Dynamically Loading Graph-Based Computations.
U.S. Appl. No. 12/638,588, filed Dec. 15, 2009, Processing Transactions in Graph-Based Applications.
U.S. Appl. No. 13/678,921, filed Nov. 16, 2012, Dynamic Graph Performance Monitoring.
U.S. Appl. No. 13/678,928, filed Nov. 16, 2012, Dynamic Component Performance Monitoring.
U.S. Appl. No. 13/733,403, filed Jan. 3, 2013, Configurable Testing of Computer Programs.
U.S. Appl. No. 14/165,698, filed Jan. 28, 2014, Configurable Testing of Computer Programs.
U.S. Appl. No. 14/561,435, filed Dec. 5, 2014, Managing Interfaces for Sub-Graphs.
U.S. Appl. No. 15/384,508, filed Dec. 20, 2016, Sub-Graph Interface Generation.
Bernstein and Newcomer, "Principles of Transaction Processing, $2^{nd}$ Edition", Morgan Kaufmann, XP002739946 (Jul. 24, 2009).

(56) References Cited

OTHER PUBLICATIONS

IBM: "Concepts and Architecture—Version 3.6," Internet citation, http://publibfp.boulder.ibm.com.epubs/pdf/h1262857, retrieved Apr. 19, 2007.

* cited by examiner

US 9,886,241 B2

MANAGING INTERFACES FOR SUB-GRAPHS

CROSS-REFERENCE TO RELATED APPLICATIONS

This application claims priority to U.S. Application Ser. No. 61/912,057, filed on Dec. 5, 2013, and to U.S. Application Ser. No. 62/031,388, filed on Jul. 31, 2014, each of which is incorporated herein by reference.

BACKGROUND

This description relates to managing interfaces for sub-graphs in a dataflow graph.

Many software applications exist for processing data. Some of these software applications are specified as dataflow graphs. Dataflow graphs typically include a number of data processing components, which are interconnected by links, sometimes referred to as "flows."

When a dataflow graph is being executed, data (e.g., a dataset) is received from a database or from some other data storage or data queueing system. The received data advances through the dataflow graph by propagating through the flows and into the components according to dependencies defined by the interconnection of the components and flows. Each component processes data that it receives according to a predetermined function associated with the component before providing the processed data as output data via a flow. At the output of the dataflow graph the processed data is, for example, stored in another data storage or data queueing system, provided to another downstream system, or presented to a user.

A developer of a dataflow graph generally specifies the graph by dragging blocks representing components onto a graphical working area (or "canvas") provided by a graphical user interface and interconnecting the components with links representing data flows such that the dataflow graph implements a desired functionality. Once the developer is satisfied with his or her implementation of the dataflow graph, he or she can save the dataflow graph to storage for later use. In general, if the developer needs to alter the implementation of the dataflow graph at a later time, he or she can cause the graphical user interface to read the saved dataflow graph from storage, make changes to the dataflow graph, and then re-save the modified dataflow graph to storage.

In some examples, one or more segments of a dataflow graph are themselves implemented using dataflow graphs, which are referred to as "sub-graphs." In those examples, a sub-graph is part of the dataflow graph. Thus, to alter a sub-graph that is used within a given dataflow graph, the developer requests the system to read the dataflow graph from disk, thereby enabling the developer to open the dataflow graph in the graphical user interface. Then the developer would, within the same graphical user interface, open the sub-graph segment so that the sub-graph can be edited. The developer can make changes to the sub-graph, and then the developer causes the dataflow graph with the modified sub-graph to be together re-saved to storage, thereby embedding the changes to the sub-graph in the saved dataflow graph.

SUMMARY

In one aspect, in general, a method for specifying a dataflow graph includes: rendering, in a first user interface, a representation of a first dataflow graph, the rendering including: rendering a plurality of components of the first dataflow graph, at least one component that represents a computation associated with at least one of data flowing into an input port or data flowing out of an output port, and rendering a link between an output port of a first component of the first dataflow graph and an input port of a second component of the first dataflow graph, based on user input indicating a flow of data from the output port of the first component to the input port of the second component; and rendering, in a second user interface, a representation of a sub-graph of the first dataflow graph, the rendering including: rendering at least one sub-graph interface, the sub-graph interface including one or more flow junctions, where a first flow junction of the sub-graph interface represents a connection between: (1) a flow of data outside the sub-graph interface to or from a port of a third component of the first dataflow graph, and (2) a flow of data inside the sub-graph interface to or from a port of a first component of the sub-graph, and rendering a link between the first flow junction and a second flow junction of the sub-graph interface based on user input indicating a relationship between: (1) a first descriptor of a data or computational characteristic associated with the first flow junction of the sub-graph interface, and (2) a second descriptor of a data or computational characteristic associated with the second flow junction of the sub-graph interface.

Aspects can include one or more of the following features.

The method further includes generating a data structure storing a representation of the first dataflow graph that includes: data representing a first set of one or more components that include one or more flows of data connected through one or more flow junctions outside of the sub-graph interface; and data representing a second set of one or more components that include one or more flows of data connected through one or more flow junctions inside of the sub-graph interface.

The relationship corresponds to the first descriptor being identical to the second descriptor.

The second user interface includes a portion configured to receive a user input that specifies properties of respective flow junctions of a set of defined flow junctions of the sub-graph interface.

The properties include a direction associated with transferring a descriptor of a data or computational characteristic associated with a corresponding flow junction.

The direction corresponds to an inward transfer of a value of a first descriptor of a data or computational characteristic from the first flow junction to the first component of the sub-graph.

The direction corresponds to an outward transfer of a value of a first descriptor of a data or computational characteristic from the first flow junction to the third component of the first dataflow graph.

The first descriptor describes a data characteristic of data transferred between the port of the third component of the first dataflow graph and the port of the first component of the sub-graph.

The data characteristic includes a format of fields of records within the transferred data.

The descriptor describes a computational characteristic of at least one of the third component of the first dataflow graph or the first component of the sub-graph.

The computational characteristic includes a degree of parallelism of execution of a computation represented by the third component of the first dataflow graph or the first component of the sub-graph.

The first user interface is generated by a first computing system.

The second user interface is generated by a second computing system different from the first computing system.

In another aspect, in general, software is stored in a non-transitory form on a computer-readable medium, for specifying a dataflow graph, the software including instructions for causing a computing system to: render, in a first user interface, a representation of a first dataflow graph, the rendering including: rendering a plurality of components of the first dataflow graph, at least one component that represents a computation associated with at least one of data flowing into an input port or data flowing out of an output port, and rendering a link between an output port of a first component of the first dataflow graph and an input port of a second component of the first dataflow graph, based on user input indicating a flow of data from the output port of the first component to the input port of the second component; and render, in a second user interface, a representation of a sub-graph of the first dataflow graph, the rendering including: rendering at least one sub-graph interface, the sub-graph interface including one or more flow junctions, where a first flow junction of the sub-graph interface represents a connection between: (1) a flow of data outside the sub-graph interface to or from a port of a third component of the first dataflow graph, and (2) a flow of data inside the sub-graph interface to or from a port of a first component of the sub-graph, and rendering a link between the first flow junction and a second flow junction of the sub-graph interface based on user input indicating a relationship between: (1) a first descriptor of a data or computational characteristic associated with the first flow junction of the sub-graph interface, and (2) a second descriptor of a data or computational characteristic associated with the second flow junction of the sub-graph interface.

In another aspect, in general, a computing system for specifying a dataflow graph includes: a first computing device configured to render, in a first user interface, a representation of a first dataflow graph, the rendering including: rendering a plurality of components of the first dataflow graph, at least one component that represents a computation associated with at least one of data flowing into an input port or data flowing out of an output port, and rendering a link between an output port of a first component of the first dataflow graph and an input port of a second component of the first dataflow graph, based on user input indicating a flow of data from the output port of the first component to the input port of the second component; and a second computing device configured to render, in a second user interface, a representation of a sub-graph of the first dataflow graph, the rendering including: rendering at least one sub-graph interface, the sub-graph interface including one or more flow junctions, where a first flow junction of the sub-graph interface represents a connection between: (1) a flow of data outside the sub-graph interface to or from a port of a third component of the first dataflow graph, and (2) a flow of data inside the sub-graph interface to or from a port of a first component of the sub-graph, and rendering a link between the first flow junction and a second flow junction of the sub-graph interface based on user input indicating a relationship between: (1) a first descriptor of a data or computational characteristic associated with the first flow junction of the sub-graph interface, and (2) a second descriptor of a data or computational characteristic associated with the second flow junction of the sub-graph interface.

In another aspect, in general, a computing system for specifying a dataflow graph includes: means for rendering, in a first user interface, a representation of a first dataflow graph, the rendering including: rendering a plurality of components of the first dataflow graph, at least one component that represents a computation associated with at least one of data flowing into an input port or data flowing out of an output port, and rendering a link between an output port of a first component of the first dataflow graph and an input port of a second component of the first dataflow graph, based on user input indicating a flow of data from the output port of the first component to the input port of the second component; and means for rendering, in a second user interface, a representation of a sub-graph of the first dataflow graph, the rendering including: rendering at least one sub-graph interface, the sub-graph interface including one or more flow junctions, where a first flow junction of the sub-graph interface represents a connection between: (1) a flow of data outside the sub-graph interface to or from a port of a third component of the first dataflow graph, and (2) a flow of data inside the sub-graph interface to or from a port of a first component of the sub-graph, and rendering a link between the first flow junction and a second flow junction of the sub-graph interface based on user input indicating a relationship between: (1) a first descriptor of a data or computational characteristic associated with the first flow junction of the sub-graph interface, and (2) a second descriptor of a data or computational characteristic associated with the second flow junction of the sub-graph interface.

Aspects can include one or more of the following advantages.

Among other advantages, the approaches to managing sub-graph interfaces, including dynamic linking of sub-graphs, facilitate code abstraction and re-use in dataflow graph development environments. Dynamic linking of a sub-graph into a subgraph interface involves delaying (e.g., until just before execution) the determination of which of multiple possible sub-graphs is to be used to implement the function associated with that sub-graph interface. Thus, a container graph (i.e., a dataflow graph that has one or more sub-graph interfaces) can be used as a template that can be re-used and customized. Template dataflow graphs can be shipped to customers. The customer can then supply graph logic that implements the sub-graph interfaces and customizes template dataflow graphs to the customer's needs and operational environment. Customers may include users of the customized dataflow graphs, and/or developers who provide customized dataflow graphs to other users.

Sub-graph interfaces provide the ability to make a dataflow graph generic across multiple implementations of the interface. Sub-graph interfaces provide the ability to develop graphs against the interface in advance of any implementation of the sub-graph interface. Sub-graph interfaces provide the ability to validate an implementation against the interface without a specific instance of use. Sub-graph interfaces provide the ability to differentiate the shipping location, permissions, encryption, or other attributes of the implementation of a sub-graph.

Some embodiments allow metadata in a container graph including a sub-graph interface to be derived from the implementation sub-graph associated with the sub-graph interface. Metadata may include, for example, a descriptor of data provided to or from a component (e.g., a record format), a computational characteristic of a component, or computing resources associated with a component. Advantageously, deriving metadata for the container graph from the implementation sub-graph makes the container graph configurable with respect to the type(s) of data emerging from or entering the implementation sub-graph. This can be especially useful when the implementation sub-graph is specified by a developer to read data having a specific record format and to pass the data to a predefined container graph for further processing. In some examples, the predefined container graph is specified by some other entity and may be read-only, encrypted or in some other way protected from being viewed and/or altered. In some examples, the implementation sub-graph may be read-only, encrypted or in some other way protected from being viewed and/or altered. Such a graph needs to be able to accommodate different types of record formats from the implementation sub-graph without requiring user intervention. Metadata in an implementation sub-graph associated with the sub-graph interface can also be derived from a container graph including that sub-graph interface, which may allow some flexibility in the use of an implementation sub-graph in different container graphs.

Developers can advantageously create and use libraries of implementations for sub-graph interfaces. Such libraries can serve to reduce development times and encourage code re-use.

Some embodiments allow for dependency analysis and introspection into sub-graph implementations of a sub-graph interface from a container graph.

A graphical user interface for developing container graphs can include graphical indications of multiple phases and how those phases apply to any sub-graph interfaces, which enables a developer to understand how different portions of the dataflow graph will be affected by those phases (e.g., which data flows will cross phase boundaries, causing the data traversing that data flow to be durably stored in a buffer).

A graphical user interface for developing sub-graph interfaces encourages developers to treat dynamically linked sub-graphs as subject to a strong abstraction barrier, requiring a sub-graph interface be developed separately from (and typically prior to) developing one or more sub-graph implementations, and in some examples, separately from (and typically prior to) developing a container graph.

Other features and advantages of the invention will become apparent from the following description, and from the claims.

DESCRIPTION

Figure 1A:
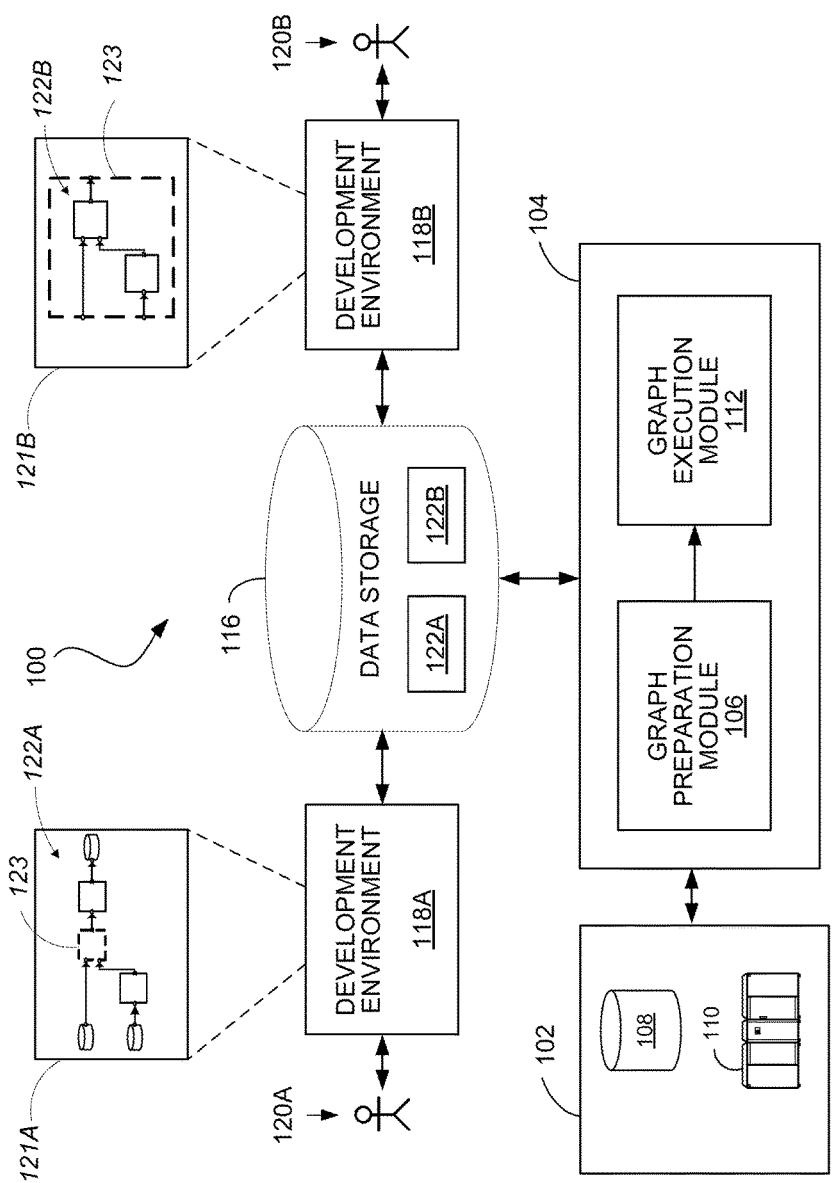
FIG. 1A is a block diagram of a system configured to use dynamically linked sub-graphs.

FIG. 1A shows an example of a data processing system 100 in which dynamically linked sub-graphs can be used. The system 100 includes a data source 102 that may include one or more sources of data such as storage devices or connections to online data streams, each of which may store or provide data in any of a variety of formats (e.g., database tables, spreadsheet files, flat text files, or a native format used by a mainframe). An execution environment 104 includes a graph preparation module 106 and a graph execution module 112. Very generally, the graph preparation module 106 assembles and links a specification of a dataflow graph (described in greater detail below) into a representation that is executable by the graph execution module 112. The execution environment 104 may be hosted, for example, on one or more general-purpose computers under the control of a suitable operating system, such as a version of the UNIX operating system. For example, the execution environment 104 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

In some examples, the execution environment 104 reads data from the data source 102, processes the data by executing a dataflow graph on the data (e.g., by the graph execution module 112), and stores the processed data in a data storage system. Storage devices providing the data source 102 may be local to the execution environment 104, for example, being stored on a storage medium connected to a computer hosting the execution environment 104 (e.g., hard drive 108), or may be remote to the execution environment 104, for example, being hosted on a remote system (e.g., mainframe 110) in communication with a computer hosting the execution environment 104, over a remote connection (e.g., provided by a cloud computing infrastructure).

The graph execution module 112 uses the representation of the dataflow graph generated by the graph preparation module 106 to process the data provided by the data source 102. The output data may be stored back in the data source 102 or in a data storage system 116 accessible to the execution environment 104, or otherwise used. The data storage system 116 is also accessible to a development environment 118A in which a developer 120A is able to make changes to the specification of a dataflow graph within a user interface 121A. In this example there are multiple separate development environments for developing different dataflow graph specifications within separate user interfaces. For example, a first developer 120A develops a container graph 122A including a sub-graph interface 123 using a first user interface 121A of the development environment 118A. A second, possibly different developer 120B uses a second user interface 121B of a development environment 118B to develop an implementation sub-graph 122B to be loaded in a sub-graph interface 123 of the container graph 112A, the implementation sub-graph conforming to the sub-graph interface 123. In some examples, the development environment 118A or 118B is a system for developing applications as dataflow graphs that include vertices (representing data processing components or datasets) connected by directed links (representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

The execution module 104 can receive data from a variety of types of systems that may embody the data source 102, including different forms of database systems. The data may be organized as records having values for respective fields (also called "attributes" or "columns"), including possibly null values. When first reading data from a data source, the execution module 104 typically starts with some initial format information about records in that data source. In some circumstances, the record structure of the data source may not be known initially and may instead be determined after analysis of the data source or the data. The initial information about records can include, for example, the number of bits that represent a distinct value, the order of fields within a record, and the type of value (e.g., string, signed/unsigned integer) represented by the bits.

Figure 1B:
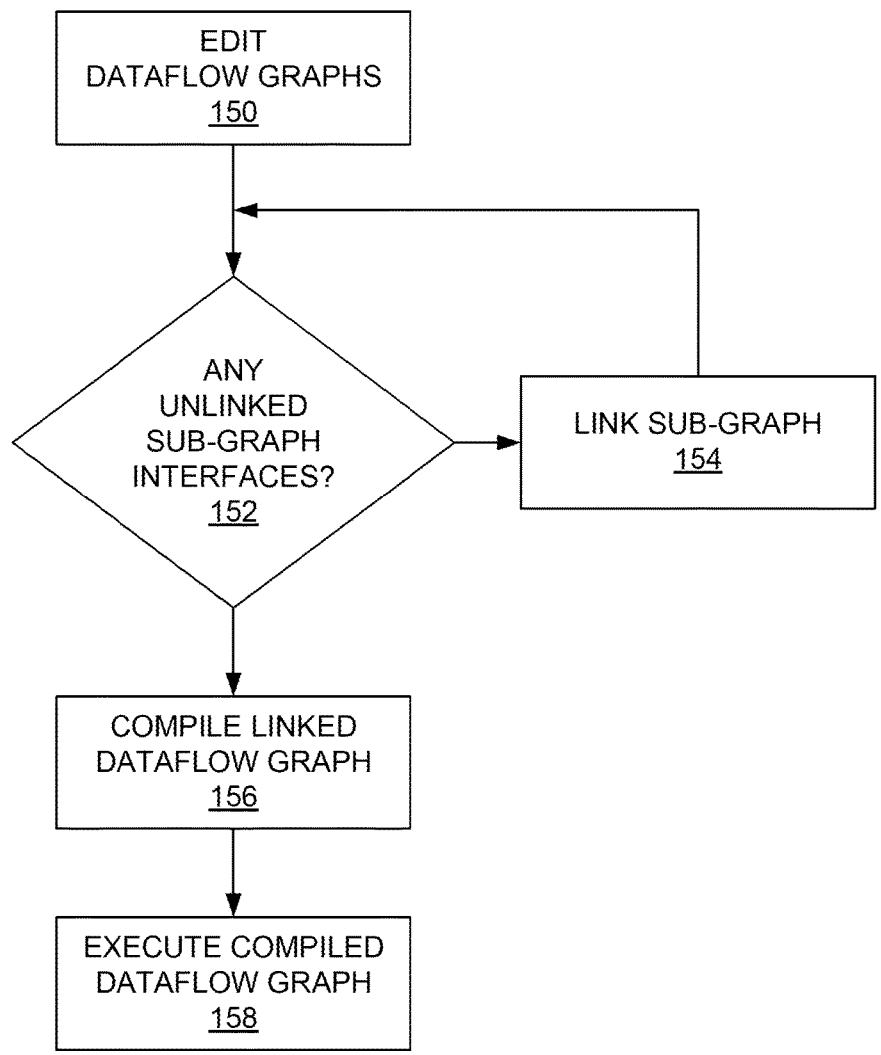
FIG. 1B is a flowchart of different stages of preparing a dataflow graph for execution.

FIG. 1B shows an example of different stages of preparing dataflow graphs for execution and executing the dataflow graphs using the data processing system 100. During edit-time, any number of developers edit (150) different dataflow graphs, which may include one developer 120A editing a container graph, and another developer 120B editing an implementation sub-graph that implements a sub-graph interface included in that dataflow graph. In some cases, an implementation sub-graph may itself include a sub-graph interface that will be implemented by its own nested implementation sub-graph. A graph developer or graph user may then initiate a process carried out by the graph preparation module 106 of preparing dataflow graphs for execution using dynamic linking of sub-graphs. The graph preparation module 106 determines (152) if there are any unlinked sub-graph interfaces in a dataflow graph being prepared. If so, the module 106 links (154) the appropriate sub-graph. During this potentially recursive process of linking (called "link-time"), there may be various parameters associated with dataflow graphs that need to be evaluated, including parameters indicating which particular implementation sub-graph should be linked to a given sub-graph interface. After dynamic linking is complete, the module 106 compiles (156) the fully assembled dataflow graph into an executable form (at "compile-time"), and the execution module 104 executes (158) the compiled dataflow graph (at "run-time"). There may be certain parameters associated with a dataflow graph that are evaluated at compile-time or at run-time.

1 CONTAINER GRAPHS, SUB-GRAPHS, AND SUB-GRAPH INTERFACES

Figure 2A:
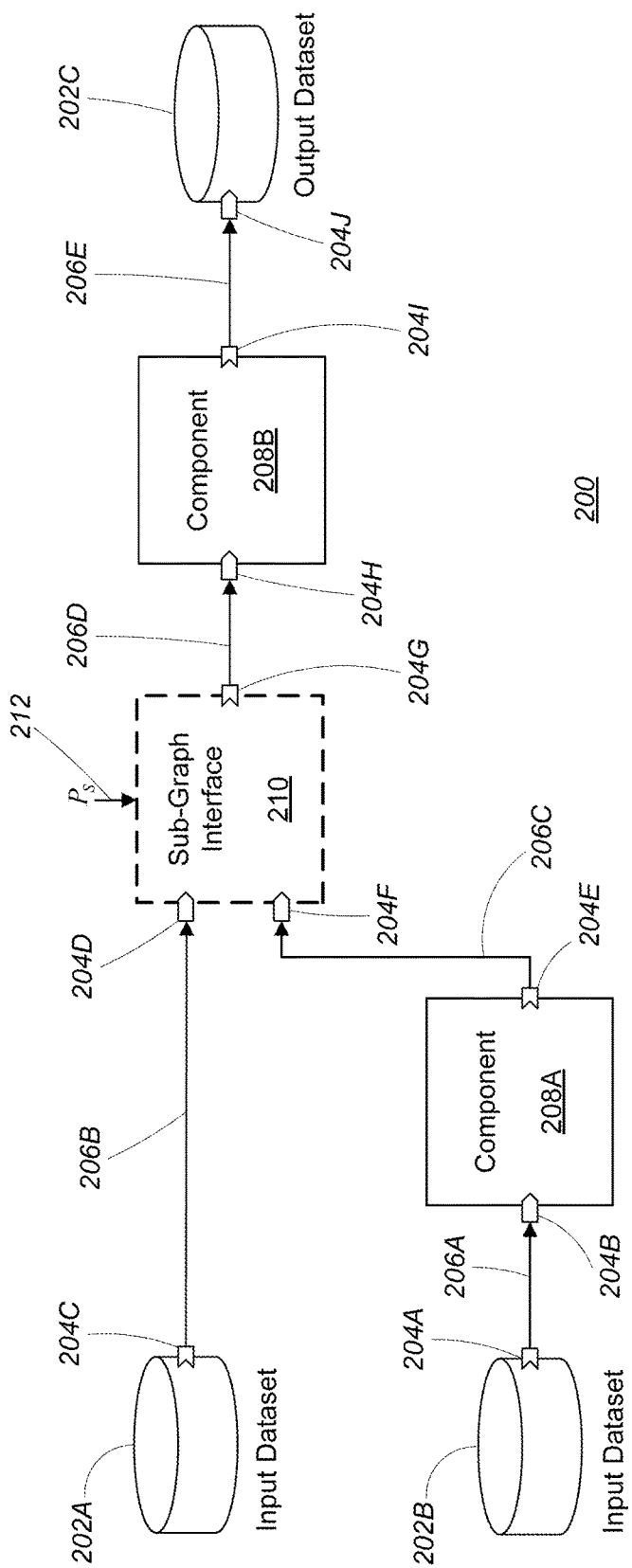
FIG. 2A is a dataflow graph including a sub-graph interface.

Referring to FIG. 2A a block diagram of a first dataflow graph 200 is configured to process data from a first input dataset 202A and a second input dataset 202B using a number of components and to store the resulting processed data in an output dataset 202C. The first dataflow graph 200 includes a first component 208A, a second component 208B, and a sub-graph interface 210. Very generally, the sub-graph interface 210 allows for a sub-graph to be dynamically loaded into the first dataflow graph. In some examples, the first dataflow graph 200 is referred to as a "container graph" due to its inclusion of a sub-graph interface.

Each of the components has one or more input ports for receiving input data and one or more output ports for providing output data. In general, each component applies a computation to the input data flowing into its input port(s) and provides the result of the computation as output via its output port(s). It is noted that in some examples, certain types of components may include only input ports or only output ports. The sub-graph interface includes one or more flow junctions, which define a point of connection between a flow in the container graph and the sub-graph associated with the sub-graph interface (as is described in further detail below). Each flow junction represents a connection (or "junction") between a flow of data to or from a port on a component of the first dataflow graph and a flow of data to or from a port on a component of the second dataflow graph. The ports of the datasets and components and the flow junctions of the sub-graph interface are interconnected by flows 206A-206E, which define how data propagates between the datasets, components, and the sub-graph interface of the first dataflow graph 200.

Specifically, for the first dataflow graph 200 of FIG. 2A, a first input port 204B included on the first component 208A is connected to a first output port 204A included on the second input dataset 202B using a first flow 206A. A first flow junction 204D included on the sub-graph interface 210 is connected to a second output port 204C included on the first input dataset 202A using a second flow 206B. A second flow junction 204F included on the sub-graph interface 210 is connected to a third output port 204E included on the first component 208A using a third flow 206C. A second input port 204H included on the second component 208B is connected to a third flow junction 204G included on the sub-graph interface 210 using a fourth flow 206D. Finally, a third input port 204J included on the output dataset 202C is connected to a fourth output port 204I included on the sub-graph interface 210 using a fifth flow 206E.

In the first dataflow graph 200, the first component 208A and the second component 208B are conventionally known dataflow graph components which implement functions such as sorting, joining, various data transformations, and so on.

The sub-graph interface 210 is a special type of node in a dataflow graph that allows for the management of the specification of a portion of the first dataflow graph 200 using dynamic linking of sub-graphs. In some examples, the sub-graph interface 210 receives a parameter input $P_S$ 212 which includes a path to a second dataflow graph specification on disk. Just prior to execution of the first dataflow graph 200, the second dataflow graph is dynamically linked into the first dataflow graph 200, essentially taking the place of the sub-graph interface 210.

In general, in order for the dynamic linking of the second dataflow graph into the first dataflow graph 200 to be possible, the second dataflow graph must conform to an interface defined by the sub-graph interface 210. That is, the second dataflow graph must have ports that are connected to the flow junctions of the sub-graph interface. By forcing the second dataflow graph to conform to the sub-graph interface 210, it is known, without inspection of the second dataflow graph, that flows connected to the ports of the sub-graph interface 210 in the first dataflow graph 200 can be directly connected to the ports of the sub-graph interface 210 in the second dataflow graph, forming a single flow between the ports in the two dataflow graphs.

Figure 2B:
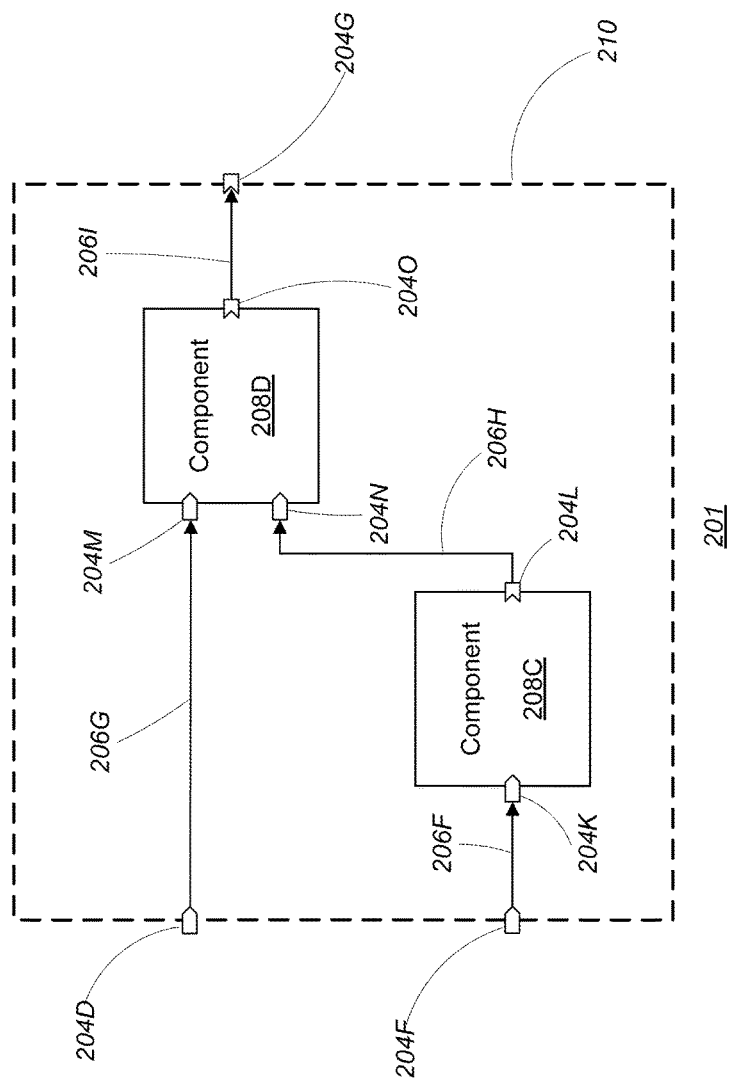
FIG. 2B is an implementation of the sub-graph interface.

Referring to FIG. 2B, one example of a second dataflow graph 201 conforms to the sub-graph interface 210 of FIG. 2A. In some examples, the second dataflow graph 201 is referred to as an "implementation sub-graph" since it conforms to and implements functionality for a sub-graph interface 210.

The second dataflow graph 201 is configured to process data from the first and second flow junctions 204D, 204F specified by the sub-graph interface 210 using a number of components and to provide the resulting processed data as output to a third flow junction 204G defined by the sub-graph interface 210. Each of the components has one or more input ports for receiving input data and one or more output ports for providing output data. The ports of the components are interconnected by flows 206F-206I, which define how data propagates between the sub-graph interface 210 and the components of the second dataflow graph 201.

Specifically, for the second dataflow graph 201 of FIG. 2B, a fourth input port 204K included on the third component 208C is connected to the second flow junction 204F included on the graph interface 210 using a sixth flow 206F. An fifth input port 204M included on the fourth component 208D is connected to the first flow junction 204D included on the graph interface 210 using a seventh flow 206G. A sixth input port 204N included on the fourth component 208D is connected to a fifth output port 204L included on the third component 208C using an eighth flow 206H. A third flow junction 204G included on the graph interface 210 is connected to a sixth output port 204O included on the fourth component 208D using a ninth flow 206I.

It is noted that in some examples, the connections between the ports of the components in the second dataflow graph 201 and the flow junctions (i.e., 206F, 206G, 206I) are not conventional flows but are instead bindings (i.e., associations) or terminal connectors between the flow junctions and the ports. When the second dataflow graph 201 is linked into the first dataflow graph 200, the bindings or terminal connectors are stripped and the ports of the components in the second dataflow graph 201 are directly connected to the flows of the first dataflow graph 200.

2 DYNAMIC LINKING

Referring again to FIG. 2A, immediately before execution of the dataflow graph by the graph execution module 112, the graph preparation module 106 processes portions of the first dataflow graph 200 and the second dataflow graph 201 to prepare the first dataflow graph 200 for execution. Among other steps, the processing includes dynamic linking (i.e., binding) of the second dataflow graph 201 into the first dataflow graph 200 at the location of the sub-graph interface 210 in the first dataflow graph 200.

To dynamically link the second dataflow graph 201 into the first dataflow graph 200, the graph preparation module 106 analyzes the parameter input $P_S$ 212 provided to the sub-graph interface 210 to determine which implementation sub-graph stored on disk is associated with the sub-graph interface 210. The determined implementation sub-graph (e.g., the second dataflow graph 201) is loaded and instantiated and its parameters and ports are bound into the first dataflow graph 200 to form a combined dataflow graph. At least some of the flow junctions of the sub-graph interface are then analyzed to determine a direction of metadata propagation, which corresponds to a direction of transfer of a descriptor of data or a computational characteristic (i.e., metadata) associated with the flow junctions. In the process of metadata propagation, for the at least some flow junctions, a descriptor of data or a computational characteristic is transferred from that flow junction to a component or a port on a component in the first dataflow graph 200 or a component or a port on a component in the second dataflow graph 201, according to the determined direction. This process of metadata propagation is described in detail below.

Figure 2C:
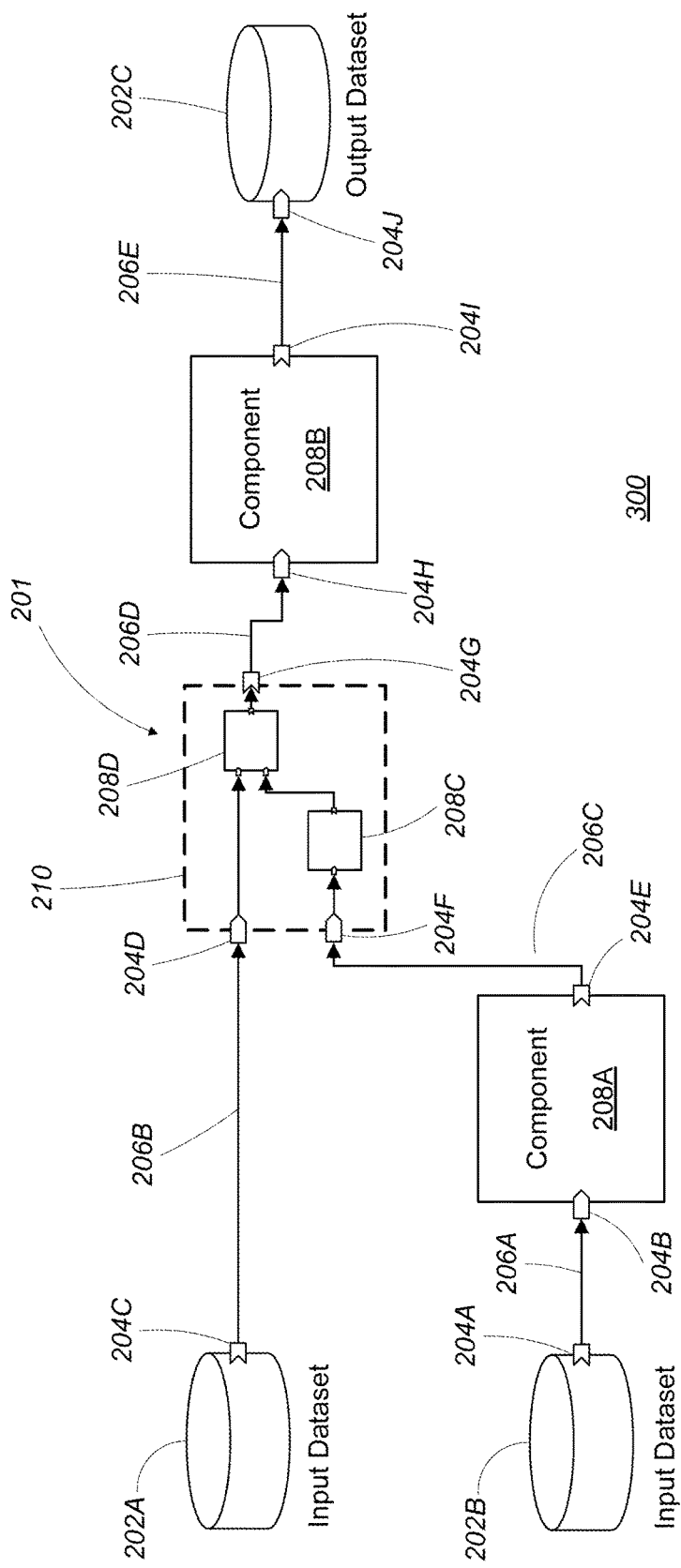
FIG. 2C is a combined dataflow graph.

Referring to FIG. 2C, a combined dataflow graph 300 includes the first dataflow graph 200 of FIG. 2A with the second dataflow graph 201 of FIG. 2B linked in place of the sub-graph interface 210. Since the second dataflow graph 201 is an implementation of the sub-graph interface 210 and conforms to the sub-graph interface 210, all of the input and output ports of the second dataflow graph 201 are connected to the components of the first dataflow graph 200 via flows.

The combined dataflow graph 300 is executable by the graph execution module 112.

3 METADATA PROPAGATION

In dataflow graphs, in general, it is important that metadata associated with the ports of components in the dataflow graph and/or metadata associated with the components themselves is managed. As described above, in some examples, metadata includes a descriptor of data (e.g., a record format for a port including a sequence of fields and data types of records flowing into or out of a port) or a computational characteristic (e.g., a partitioning or a layout for a component). In some examples, metadata may include an amount of memory a component may use, which computing resources a component may use, sortedness, compression method, character set, binary representation (e.g., big-endian, little-endian), or data transformations.

Metadata management can be accomplished manually, automatically, or by using a combination of manual and automatic metadata management. For manual metadata management, metadata is supplied, for example, by a graph developer or by a graph user. For automatic metadata management, metadata is propagated from portions of the graph for which metadata has been explicitly defined (e.g., by a graph developer or by a graph user) metadata to portions of the graph for which metadata has not been explicitly defined. Metadata propagation is used when metadata for a given port or component is not directly supplied by a graph user or developer. In such a case, the metadata for the given port or component is derived from other ports or components in the graph. The term metadata propagation as is used herein refers to this derivation process.

In the first dataflow graph 200 of FIG. 2A, one simple example of conventional metadata propagation occurs when no record format metadata is explicitly defined for the first input port 204B of the first component 208A. The first input port 204B is connected to the first output port 204A of the second input dataset 202B via the first flow 206A. In general, the record format of the data supplied by the second input dataset 202B is always explicitly known and the metadata associated with the first output port 204A is therefore explicitly defined. The explicitly defined metadata associated with the first output port 204A is propagated over the first flow 206A to the first input port 204B where it is associated with the first input port 204B.

The above described metadata propagation between the first output port 204A and the first input port 204B occurred over the first flow 206A in the same direction that data flows through the dataflow graph (i.e., from left to right). However, in some examples, metadata propagates over flows in a direction opposite to the direction that data flows through the dataflow graph. For example, the explicitly defined metadata associated with the third input port 204J of the output dataset 202C propagates over the fifth flow 206E to the fourth output port 204I of the second component 208B in a direction opposite to the direction that data flows over the fifth flow 206E.

In a conventional dataflow graph including conventional components and datasets this propagation of explicitly defined metadata through the dataflow graph results in all ports and components in the dataflow graph being associated with metadata. Any conflicts arising in metadata propagation are generally flagged for developer intervention. However, metadata propagation for dataflow graphs including a sub-graph interface is generally handled differently from metadata propagation for dataflow graphs including only conventional components. In particular, metadata may be propagated in two stages: an edit-time metadata propagation stage and a link-time metadata resolution stage.

Using this two stage approach, at edit-time, the developer of the container graph (i.e., the graph including a sub-graph interface) and the developer of the implementation sub-graph (i.e., the sub-graph which conforms to the sub-graph interface) that will be linked in place of the sub-graph interface do not need to be aware of each other's metadata. Without access to the propagation information, conventional metadata propagation would have no way of knowing whether metadata should be propagated in a direction "inward" into the implementation sub-graph (i.e., the container graph acts as a source of metadata for the implementation sub-graph) or in a direction "outward" from the implementation sub-graph (i.e., the container graph acts as a sink for metadata from the implementation sub-graph).

To facilitate metadata propagation in a dataflow graph including a sub-graph interface, each flow junction of the sub-graph interface specifies a direction of metadata propagation. Metadata is associated with the flow junction during the edit-time metadata propagation, and then the associated metadata is transferred from the flow junction at link-time according to the direction of metadata propagation. In some examples, the set of possible directions of metadata propagation includes "inward" propagation and "outward" propagation. The particular inward or outward value of the direction can be stored in the form of a Boolean variable that can be retrieved, for example, for such propagation or otherwise determining the indicated direction of metadata propagation.

3.1.1 Inward Metadata Propagation

When a flow junction on the sub-graph interface is declared as having a metadata propagation direction of "inward," metadata propagation in the container graph supplies a metadata definition via the flow connected to the flow junction (and eventually to a port connected to a flow (or binding) in the implementation sub-graph).

That is, in the container graph, edit-time metadata propagation treats the flow junction as a metadata sink. In particular, edit-time metadata propagation in the container graph propagates metadata between conventional components in the container graph using conventional metadata propagation as is described above. When metadata is propagated to a flow junction on a sub-graph interface with an "inward" metadata propagation direction, the metadata can propagate no further. This metadata is maintained at the flow junction until the implementation sub-graph is linked into the container graph and link-time metadata resolution can be performed (as is described below).

In the implementation sub-graph, edit-time metadata propagation treats the flow junction having an "inward" metadata propagation direction as a metadata source. However, in the case of the implementation sub-graph, the actual metadata value at the flow junction on the sub-graph interface is unknown (since it is only available from the container graph at link-time). Thus, in order to perform edit-time propagation for the implementation sub-graph, a placeholder value is assigned for the metadata at the flow junction and is propagated through the implementation sub-graph using conventional metadata propagation as is described above. The placeholder value is resolved when the implementation sub-graph is linked into the container graph and link-time metadata resolution is performed.

During the link-time metadata resolution stage, with the implementation sub-graph linked into the container graph, the metadata that was maintained at the flow junction with an "inward" metadata propagation direction is transferred into the implementation sub-graph and to the appropriate ports of the components of the implementation sub-graph. In some examples, link-time metadata resolution resolves the placeholder value at the flow junction in the implementation sub-graph by simply replacing the placeholder value with the metadata value that was maintained at the corresponding flow junction in the container graph.

In some examples, "inward" metadata propagation is the default, and is appropriate even when the graph container the sub-graph interface will always be supplying an explicit metadata definition.

3.1.2 Outward Metadata Propagation

When a flow junction on the sub-graph interface is declared as having a metadata propagation direction of "outward," metadata propagation in the implementation sub-graph supplies a metadata definition for the flow junction to the container graph.

That is, in the container graph, edit-time metadata propagation treats the flow junction as a metadata source even though an edit-time definition for the metadata is not present (since the definition is only available from the implementation sub-graph at link-time). In particular, edit-time metadata propagation in the container graph propagates metadata between conventional components in the container graph using conventional metadata propagation as is described above. When metadata is propagation is performed on a flow junction on the sub-graph interface having a metadata propagation direction of outward, a placeholder value is assigned for the metadata at the flow junction and the placeholder value is propagated through the container graph using conventional metadata propagation.

In the implementation sub-graph, edit-time metadata propagation treats the flow junction having an "outward" metadata propagation direction as a metadata sink. In particular, edit-time metadata propagation in the implementation sub-graph propagates metadata between conventional components in the container graph using conventional metadata propagation as is described above. When metadata is propagated to a flow junction on the sub-graph interface having an "outward" metadata propagation direction, the metadata can propagate no further. This metadata is maintained at the flow junction until the implementation sub-graph is linked into the container graph and link-time metadata resolution can be performed (as is described below).

During the link-time metadata resolution stage, with the implementation sub-graph linked into the container graph, the metadata that was maintained at the flow junction with an "outward" metadata propagation direction is transferred out to the container graph and to the appropriate ports of the components of the container graph. In some examples, link-time metadata resolution identifies the placeholder value at the flow junction in the container sub-graph and simply replaces the placeholder value with the metadata value that was maintained at the flow junction in the implementation sub-graph.

In some examples, the developer is not allowed to explicitly define the metadata for a flow junction with an "outward" metadata propagation direction.

4 SUB-GRAPH INTERFACE DEVELOPMENT GRAPHICAL USER INTERFACE

Figure 2D:
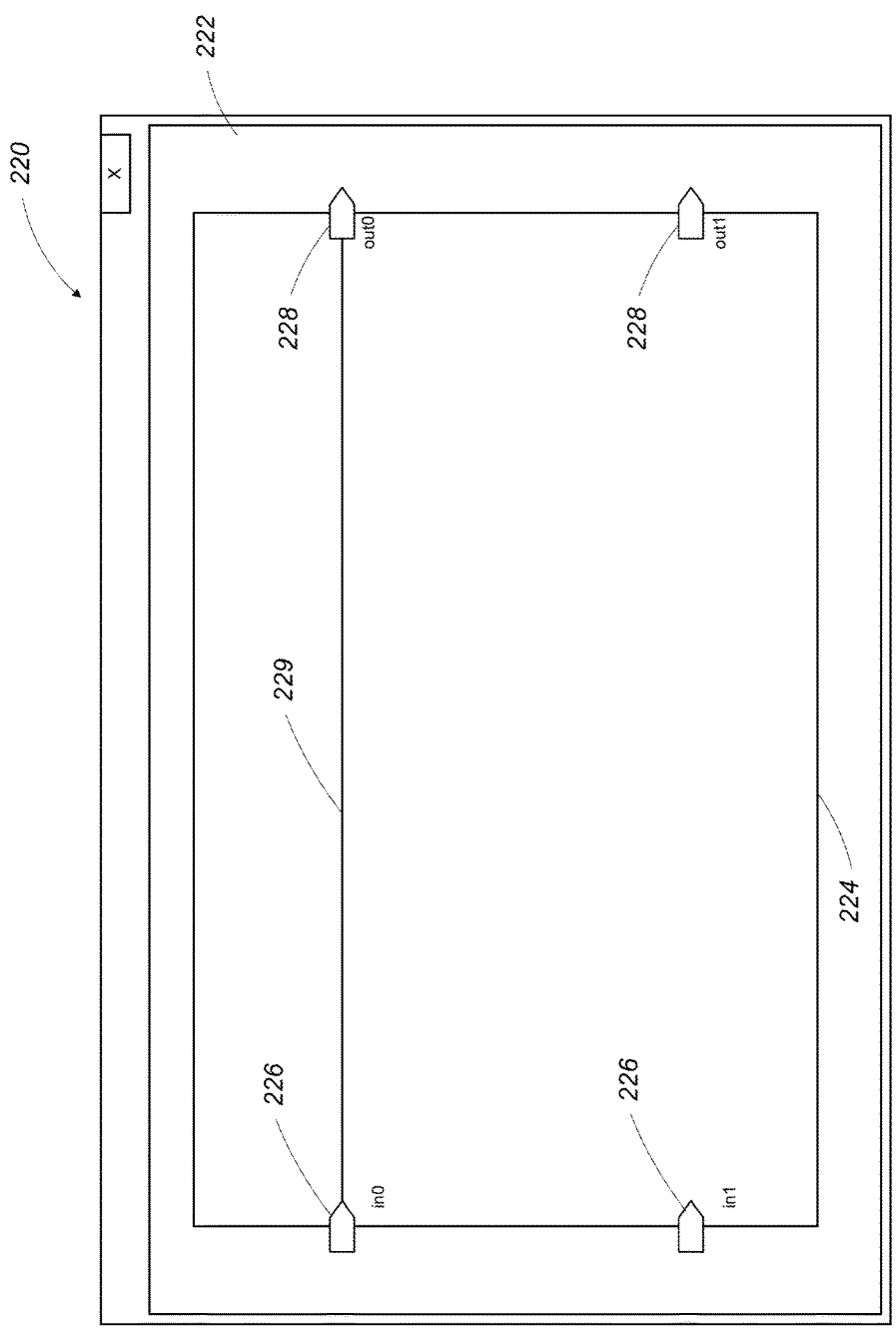
FIG. 2D is a sub-graph interface development user interface.

Referring to FIG. 2D, a sub-graph interface development graphical user interface 220 facilitates creation, inspection, and modification of a sub-graph interface 224. The sub-graph user interface development graphical user interface 220 includes a display window 222 which is used to present a graphical representation of the sub-graph interface 224 including a number of input flow junctions 226, output flow junctions 228, and one or more links 229 between the input and output flow junctions 226, 228 to a developer.

Very generally, the sub-graph interface 224 acts as a strict prototype to which any sub-graph implementations of the sub-graph interface 224 and any container graphs that include the sub-graph interface 224 must conform. As such, the outside of the sub-graph interface 224 in the graphical user interface 220 can be thought of as a placeholder for a separately developed container graph and the inside of the sub-graph interface 224 in the graphical user interface can be thought of as a placeholder for a separately developed sub-graph implementation.

The flow junctions 226, 228 are disposed on the boundary of the sub-graph interface 224 and act as a bridge, connecting a flow of data to or from a port of a component outside of the sub-graph interface 224 (e.g., a flow of data from a port of a component in a container graph) and a flow of data to or from a port of a component inside of the sub-graph interface 224 (i.e., a flow of data to a port of a component in a sub-graph implementation). In FIG. 2D, the sub-graph interface 224 includes two input flow junctions 226 (i.e., in0 and in1) and two output flow junctions 228 (i.e., out0, out1). However, any number of input flow junctions 226 and output flow junctions 228 can be included on the sub-graph interface 224.

Each of the input flow junctions 226 is associated with a direction (i.e., inward or outward) of propagation of a descriptor of data and/or a computational characteristic (i.e., metadata). As is described above, the direction of propagation determines whether the metadata propagated through the input flow junction 226 is provided by a container graph or a sub-graph implementation. If the direction of propagation for the input flow junction 226 is outward, the input flow junction 226 defines the record format of data passing through the input flow junction 226 and the layout of components attached to the input flow junction 226.

Similarly, each of the output flow junctions 228 is associated with a direction (i.e., inward or outward) of propagation of a descriptor of data and/or a computational characteristic (i.e., metadata). As is described above, the direction of propagation determines whether the metadata propagated through the output flow junction 228 is provided by a container graph or a sub-graph implementation. If the direction of propagation for the output flow junction 228 is outward, the output flow junction 228 defines the record format of data passing through the output flow junction 228 and the layout of components attached to the output flow junction 228.

In some examples, a developer can add flow junctions 226, 228 by right clicking on the boundary of the sub-graph interface 224 and selecting an "Add Input Flow Junction" or an "Add Output Flow Junction" menu item from a right click menu. In other examples, the graphical user interface 220 includes a special tool for adding flow junctions to the sub-graph interface 224. Similarly, flow junctions can be removed from the sub-graph interface 224 using a right click menu option or a specialized tool.

The one or more links 229 between the input and output flow junctions 226, 228 are indicative of relationships between data descriptors of data or computational characteristics (i.e., metadata) associated with the input flow junctions 226 and data descriptors of a data or computational characteristics (i.e., metadata) associated with the output flow junctions 226. In FIG. 2D, a single link 229 connects a first input flow junction, in0, to a first output flow junction, out0. The link 229 indicates that there is a relationship between the data or computational characteristic (i.e., metadata) associated with the first input flow junction, in0, and the data or computational characteristic (i.e., metadata) of the first output flow junction, out0. In some examples, the link 229 indicates that any data or computational characteristics (i.e., metadata) associated with the first input flow junction, in0, and the first output flow junction, out0, must be the same. This can be accomplished, for example, by the link 229 indicating that one characteristic is derived from the other.

In some examples, a developer can create links 229 between the input and output flow junctions 226, 228 by clicking on a first flow junction of a first type (e.g., an input flow junction) and drawing a line on the inside of the sub-graph interface 224 from the first flow junction to a second flow junction of a second type (e.g., an output flow junction), thereby connecting the two flow junctions using the line.

Figure 2E:
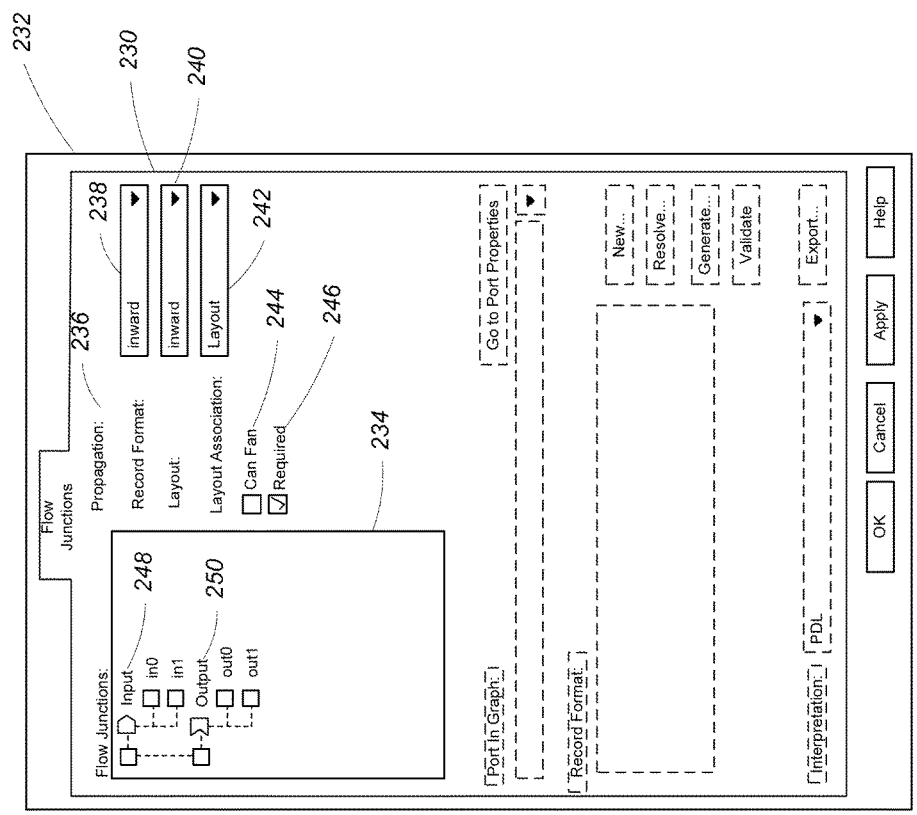
FIG. 2E is a port configuration tab of a sub-graph interface properties user interface.

Referring to FIG. 2E, a flow junction configuration tab 230 of a sub-graph interface properties user interface 232 allows a user to configure one or more of the flow junctions of the sub-graph interface. The flow junction configuration tab includes a junction list control 234, and a propagation control section 236 including a record format metadata propagation direction control 238, a layout metadata propagation direction control 240, a layout association control 242, a 'can fan' control 244, and a required control 246.

The flow junctions list control 234 displays a list of all flow junctions, categorized into an input flow junction category 248 and an output flow junction category 250. A developer can select one or more of the flow junctions from the flow junctions list control 234 for configuration. The developer can then configure the selected flow junctions using the controls 238, 240, 242, 244, 246 in the propagation control section 236. In particular, the developer can select whether the direction of record format metadata propagation for the selected flow junctions is inward or outward using the record format metadata propagation direction control 238. The developer can select whether the direction of layout metadata propagation for the selected flow junctions is inward or outward using the layout metadata propagation direction control 240. The developer can select a name of a layout parameter associated with the selected flow junctions using the layout association control 242. The developer can specify whether the selected flow junctions are allowed to fan-in or fan-out using the 'can fan' control 244. The developer can specify whether the selected flow junctions are required by the sub-graph interface using the required control 246.

In some examples, the flow junction configuration tab 230 of the sub-graph interface properties user interface 232 can be accessed by the developer right clicking on the sub-graph interface and selecting a properties item from a right click menu.

In some examples, the graphical user interface 220 of FIG. 2D can also be utilized to define a number of phases allowed in sub-graph interfaces of the sub-graph interface 224.

5 EXAMPLES

The following sections provide examples of metadata propagation for the dataflow graphs of FIGS. 2A and 2B. The dashed bold lines in FIGS. 3A-3C and FIGS. 4A-4C indicate metadata propagation with the arrowhead on the lines indicating a direction of metadata propagation.

5.1 Record Format Metadata Propagation

Figure 3A:
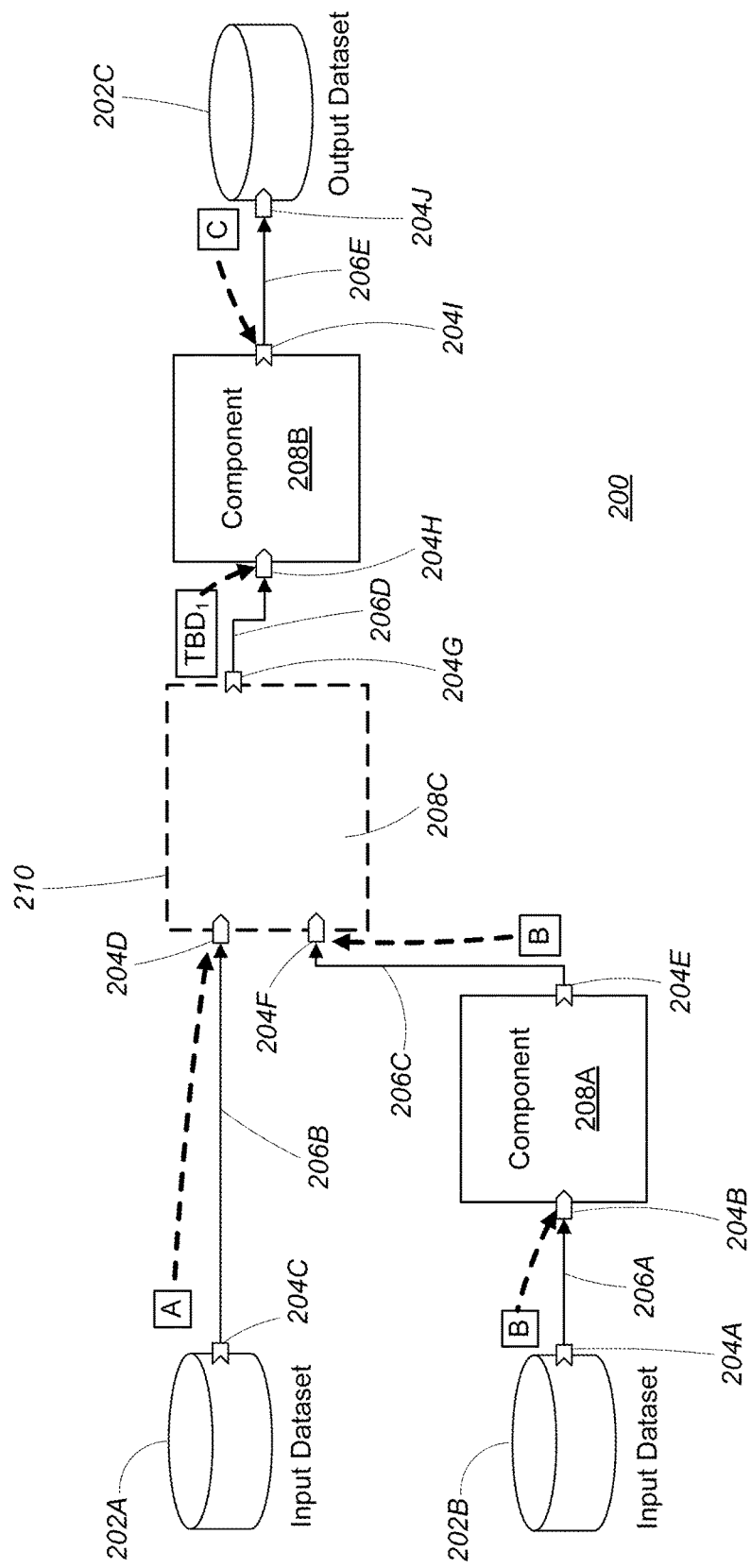
FIG. 3A illustrates edit-time record format metadata propagation in the dataflow graph of FIG. 2A.
Figure 3B:
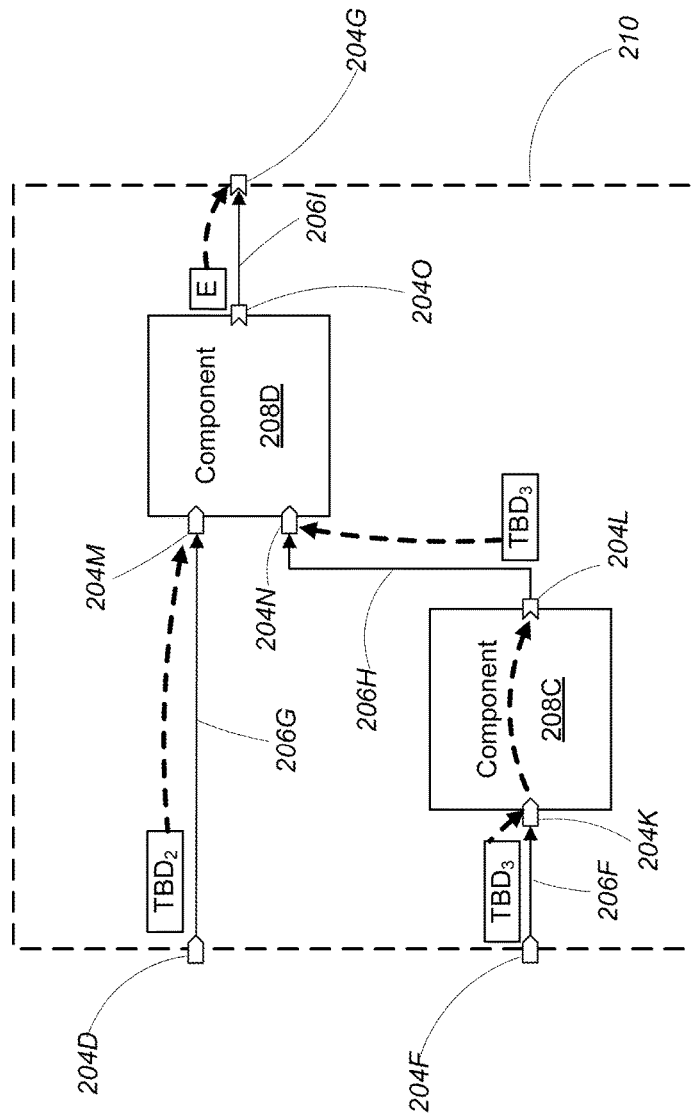
FIG. 3B illustrates edit-time record format metadata propagation in the implementation of the sub-graph interface of FIG. 2B.
Figure 3C:
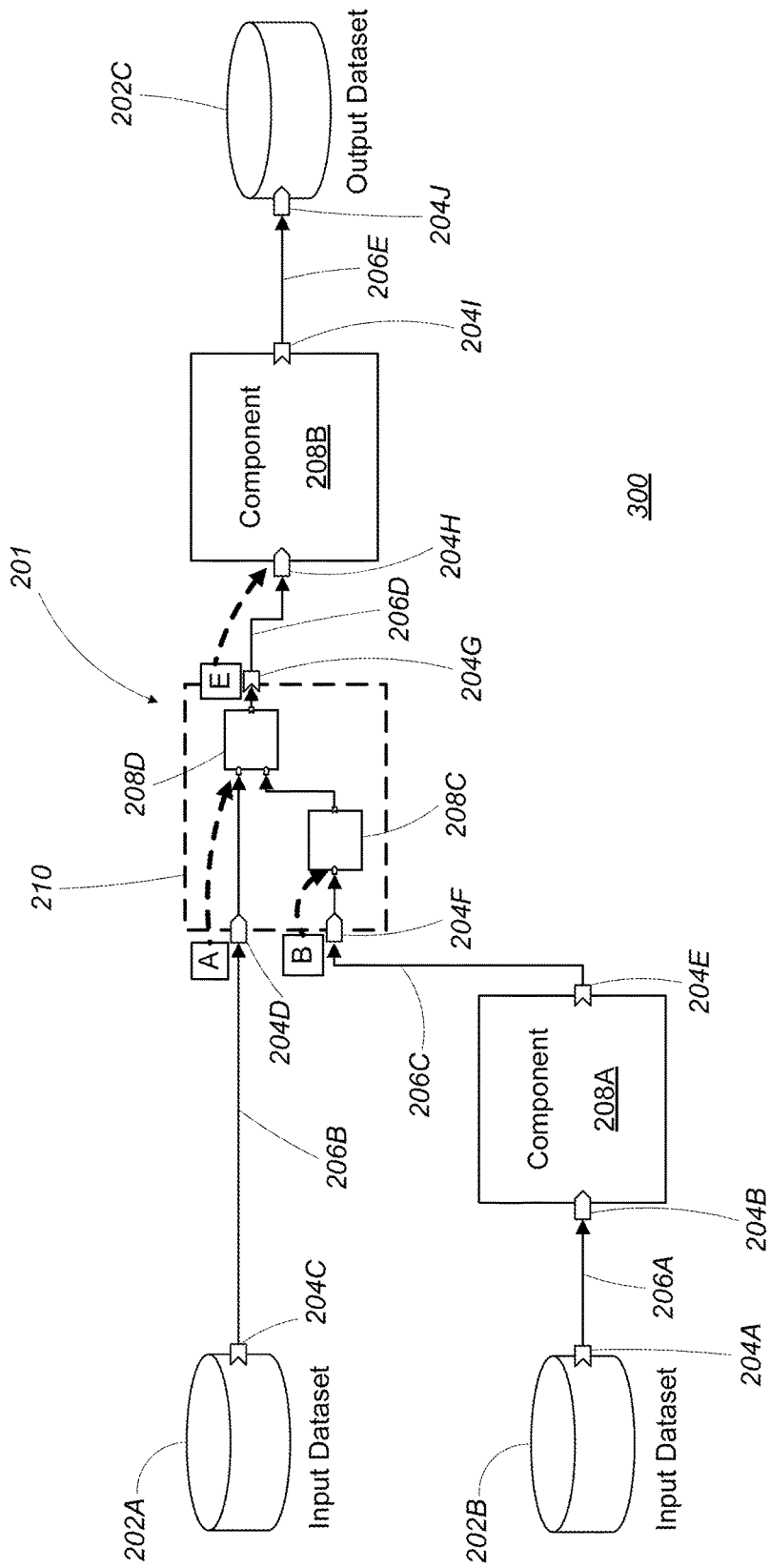
FIG. 3C illustrates link-time record format metadata propagation in the combined dataflow graph of FIG. 2C.

Referring to FIGS. 3A-3C, an example of record format metadata propagation in the first dataflow graph 200 of FIG. 2A and the second dataflow graph 201 of FIG. 2B is illustrated. Referring now to FIG. 3A, in the present example, it is assumed that the first flow junction 204D of the sub-graph interface 210 and the second flow junction 204F of the sub-graph interface 210 both have a metadata propagation direction of "inward" and the third flow junction 204G of the sub-graph interface has a metadata propagation direction of "outward." It is also assumed that the only explicitly defined metadata in the first dataflow graph 200 is the record format A associated with the second output port 204C of the first input dataset 202A, the record format B associated with the first output port 204A of the second input dataset 202B, and the record format C associated with the third input port 204J of the output dataset 202C.

While the graph developer is editing the first dataflow graph 200, edit-time record format metadata propagation is performed on the first dataflow graph 200. In particular, the record format A is propagated from the second output port 204C of the first input dataset 202A to the first flow junction 204D of the sub-graph interface 210 via the second flow 206B. Since the first flow junction 204D has a metadata propagation direction of "inward," the record format A is not propagated any further and is maintained at the first flow junction 204D for later use in the link-time metadata resolution stage.

The record format B is propagated from the first output port 204A of the second input dataset 202B to the first input port 204B of the first component 208A via the first flow 206A where the record format B is associated with the first input port 204B. The edit-time metadata propagation process determines that the first component 208A does not apply any transformation to the metadata and therefore propagates the record format B through the component and associates it with the third output port 204E of the first component 208A.

The record format B is then propagated from the third output port 204E of the first component 208A to the second flow junction 204F of the sub-graph interface 210 via the third flow 206C. Since the second flow junction 204F has a metadata propagation direction of "inward," the record format B is not propagated any further and is maintained at the second flow junction 204F for later use in link-time metadata resolution.

The record format C is then propagated from the third input port 204J of the output dataset 202C to the fourth output port 204I of the second component 208B via the fifth flow 206E where the record format C is associated with the fourth output port 204I.

Since the third flow junction 204G of the sub-graph interface 210 has a metadata propagation direction of "outward," the metadata associated with the flow junction is unknown at edit-time in the first dataflow graph 200 and is expected to be provided by the implementation sub-graph at link-time. For this reason, a placeholder record format $TBD_1$ is temporarily associated with the third flow junction 204G. The placeholder record format $TBD_1$ is propagated to the second input port 204H of the second component 208B via the fourth flow 206D where it is temporarily associated with the second input port 204H. The placeholder is maintained at the third flow junction 204G and the second input port 204H until link-time metadata resolution resolves the actual value of $TBD_1$ and associates the actual value as the metadata for the third flow junction 204G and the second input port 204H.

Referring to FIG. 3B, while the graph developer is editing the second dataflow graph 201, edit-time metadata propagation is performed on the second dataflow graph 201. The second dataflow graph 201 has a single port, the sixth output port 204O of the fourth component 208D, with metadata explicitly defined as record format E.

As is described above, the second dataflow graph 201 conforms to the sub-graph interface 210 (i.e., the sub-graph interface included in the first dataflow graph 200). For this reason, the metadata propagation directions of the ports of the sub-graph interface 210 are the same in the second dataflow graph 201 as they were in the first dataflow graph 200. That is, the first flow junction 204D of the sub-graph interface 210 and the second flow junction 204F of the sub-graph interface 210 both have a metadata propagation direction of "inward" and the third flow junction 204G of the sub-graph interface has a metadata propagation direction of "outward."

Since the first flow junction 204D has a metadata propagation direction of "inward," the metadata associated with the port is unknown at edit-time in the second dataflow graph 201 and is expected to be provided by the container graph (i.e., the first dataflow graph 200) at link-time. For this reason, a placeholder record format $TBD_2$ is temporarily associated with the first flow junction 204D. The placeholder record format $TBD_2$ is propagated to the fifth input port 204M of the fourth component 208D via the seventh flow 206G where it is temporarily associated with the fifth input port 204M. The placeholder is maintained at the first flow junction 204D and the fifth input port 204M until link-time metadata resolution resolves the actual value of $TBD_2$ and associates the actual value as the metadata for the fifth input 204M.

Similarly, since the second flow junction 204F has a metadata propagation direction of "inward," the metadata associated with the port is unknown at edit-time in the second dataflow graph 201 and is expected to be provided by the container graph (i.e., the first dataflow graph 200) at link-time. For this reason, a placeholder record format $TBD_3$ is temporarily associated with the second flow junction 204F. The placeholder record format $TBD_3$ is propagated to the fourth input port 204K of the third component 208C via the sixth flow 206F where it is temporarily associated with the fourth input port 204K. The edit-time metadata propagation process then determines that the third component 208C does not apply any transformation to the metadata and therefore propagates the record format $TBD_3$ through the component and associates it with the fifth output port 204L of the third component 208C. $TBD_3$ is then propagated to the sixth input port 204N of the fourth component 208D via the eighth flow 206H where it is temporarily associated with the sixth input port 204N.

The placeholder $TBD_3$ is maintained at the second flow junction 204F and at the three ports 204K, 204L, 204N until link-time metadata resolution resolves the actual value of $TBD_3$ and associates the actual value as the metadata for the ports.

The record format E is propagated from the sixth output port 204O of the fourth component 208D to the third flow junction 204G of the sub-graph interface 210 via the ninth flow 206I. Since the third flow junction 204G has a metadata propagation direction of "outward," the record format F is not propagated any further and is maintained at the third flow junction port 204G for later use in link-time metadata resolution.

Referring to FIG. 3C, just before run-time, the second dataflow graph 201 is linked into the first dataflow graph 200 resulting in the combined dataflow graph 300 and link-time metadata resolution is performed. To perform link-time metadata resolution, the properties of each of the flow junctions of the sub-graph interface 210 are analyzed to determine their associated direction of metadata propagation. For flow junctions of the sub-graph interface 210 having a metadata propagation direction of inward, record format metadata which is maintained at the flow junctions in the first dataflow graph 200 is transferred "inward" to the appropriate ports of the components of the second dataflow graph 201. Similarly, for flow junctions of the sub-graph interface 210 having a metadata propagation direction of outward, record format metadata which is maintained at the flow junctions in the second dataflow graph 201 is transferred outward to the appropriate ports of the components of the first dataflow graph 200.

In particular, the first flow junction 204D is analyzed and it is determined that the first flow junction 204D has a metadata propagation direction of "inward." It is then determined that the first flow junction 204D is associated with defined metadata record format A in the first dataflow graph 200 and with placeholder metadata $TBD_2$ in the second dataflow graph 201. The link-time metadata resolution stage associates all ports associated with $TBD_2$ in the second dataflow graph 201 (i.e., the fifth input port 204M) with record format A.

The second flow junction 204F is analyzed and it is determined that the second flow junction 204F has a metadata propagation direction of "inward." It is then determined that the second flow junction 204F is associated with defined metadata record format B in the first dataflow graph 200 and with placeholder metadata $TBD_3$ in the second dataflow graph 201. The link-time metadata resolution stage associates all ports associated with $TBD_3$ in the second dataflow graph 201 (i.e., the fourth input port 204K, the fifth output port 204L, and the sixth input port 204N) with record format B.

The third flow junction 204G is analyzed and it is determined that the third flow junction 204G has a metadata propagation direction of "outward." It is then determined that the third flow junction 204G is associated with defined metadata record format E in the second dataflow graph 201 and with placeholder metadata $TBD_1$ in the first dataflow graph 200. The link-time metadata resolution stage associates all ports associated with $TBD_1$ in the first dataflow graph 200 (i.e., the second input port 204H) with record format E.

As a result of the above-described edit-time metadata propagation and link-time metadata resolution processes, all of the ports in the combined dataflow graph 300 are associated with valid record format metadata.

5.2 Layout Metadata Propagation

Figure 4A:
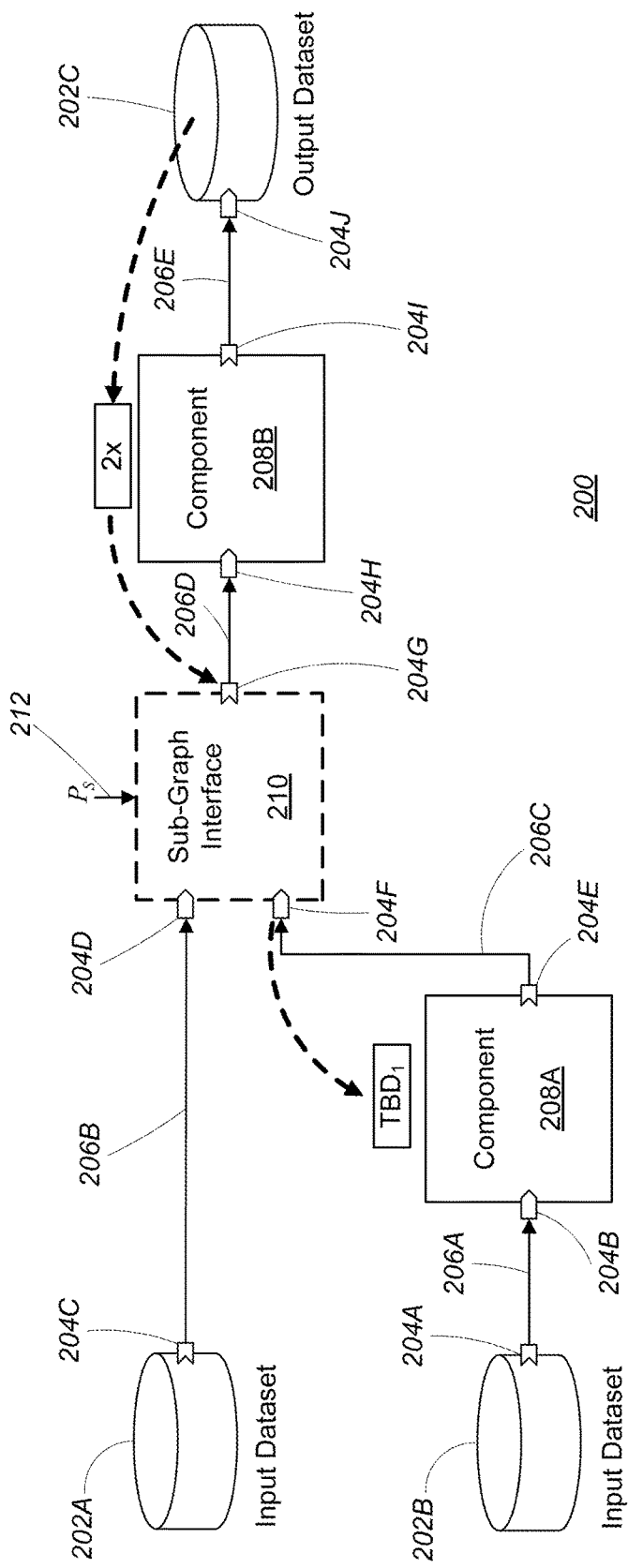
FIG. 4A illustrates edit-time layout metadata propagation in the dataflow graph of FIG. 2A.
Figure 4B:
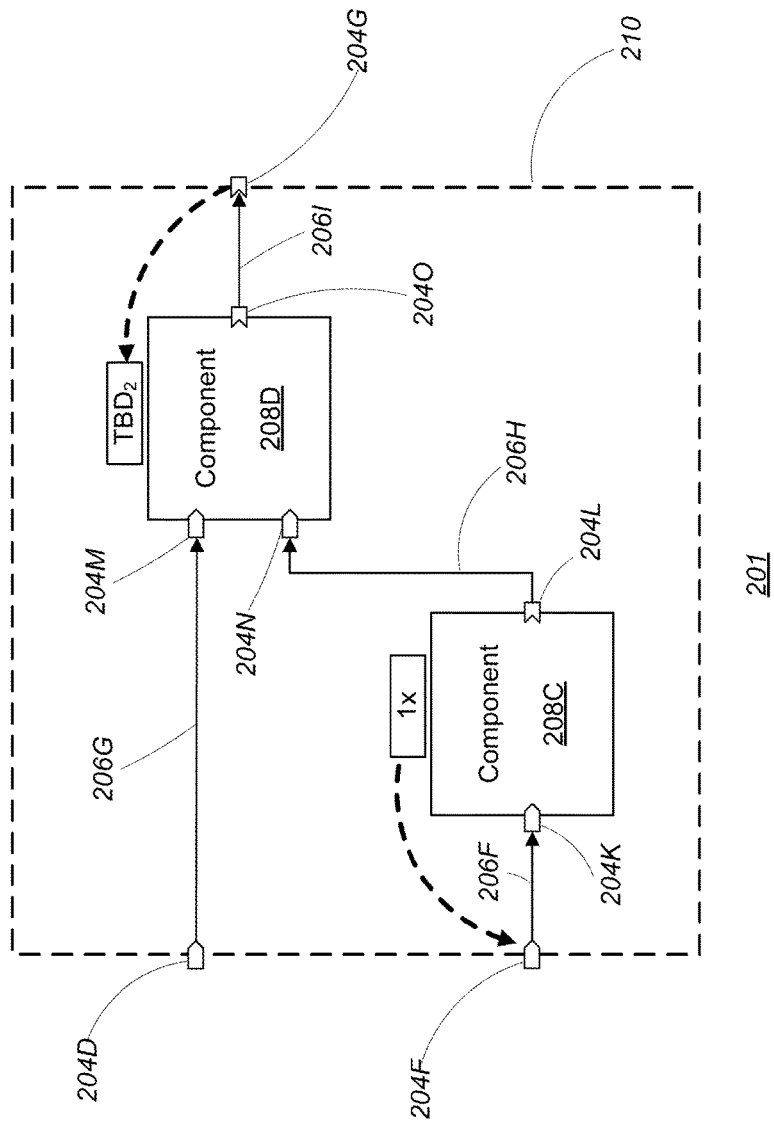
FIG. 4B illustrates edit-time layout metadata propagation in the implementation of the sub-graph interface of FIG. 2B.
Figure 4C:
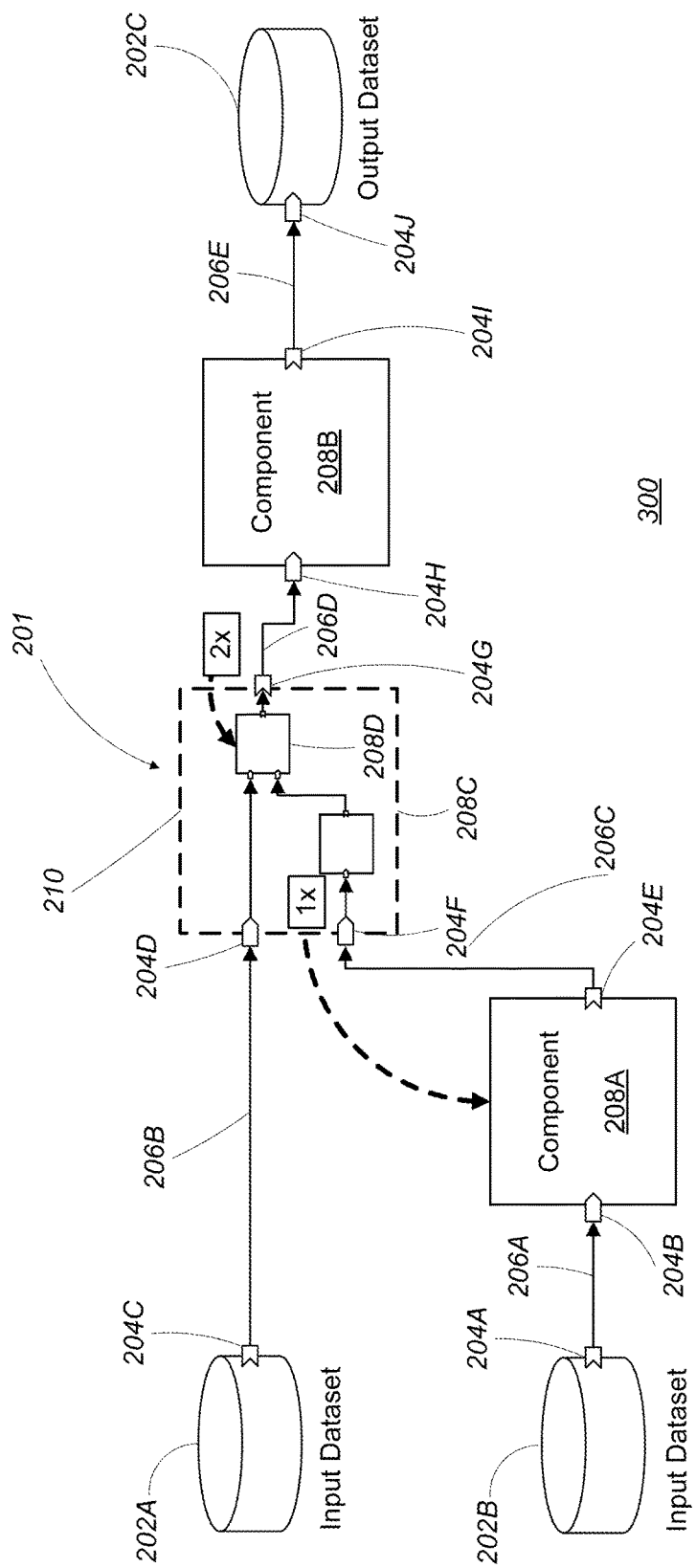
FIG. 4C illustrates link-time layout metadata propagation in the combined dataflow graph of FIG. 2C.

Referring to FIGS. 4A-4C, an example of layout metadata propagation in the first dataflow graph 200 of FIG. 2A and the second dataflow graph 201 of FIG. 2B is illustrated. To facilitate layout metadata propagation, a designer of the sub-graph interface 212 specifies one or more layout metadata parameters which are associated with the sub-graph interface 212. For each of the one or more layout metadata parameters, the sub-graph interface designer specifies a direction of metadata propagation. With the layout metadata parameters defined, the designer of the sub-graph interface 212 associates each of the flow junctions of the sub-graph interface with one of the layout metadata parameters. In some examples, each flow junction has its own unique layout metadata parameter specified. In other examples, there are fewer layout metadata parameters than there are flow junctions and certain layout metadata parameters are associated with more than one flow junction. In such examples, flow junctions which share a common layout metadata parameter must all comply with the direction of metadata propagation and the propagated layout value associated with the common layout metadata parameter.

Referring now to FIG. 4A, in the present example, it is assumed that the sub-graph interface 212 has two layout metadata parameters associated with it: a first layout metadata parameter having an "outward" metadata propagation direction and a second layout metadata parameter having an "inward" metadata propagation direction. The first layout metadata parameter is associated with the first flow junction 204D and the second flow junction 204F. The a second layout metadata parameter is associated with the third flow junction 204G. It is also assumed that the layout metadata associated with the first component 208A and the second component 208B is not explicitly defined and is therefore defined by metadata propagation.

While the graph developer is editing the first dataflow graph 200, edit-time layout metadata propagation is performed on the first dataflow graph 200. Since layout metadata for the first component 208A is not explicitly defined, it is expected that its layout metadata will be propagated from the second flow junction 204F which is associated with the first layout metadata parameter having a metadata propagation direction of "outward." However, the layout metadata associated with the second flow junction 204F is unknown at edit-time in the first dataflow graph 200 and is expected to be provided by the implementation sub-graph at link-time. For this reason, placeholder layout metadata $TBD_1$ is propagated to and temporarily associated with the first component 208A. The placeholder layout metadata is maintained at the first component 208A until link-time metadata resolution resolves the actual value of $TBD_1$ and associates that actual value as the layout metadata for the first component 208A.

Similarly, layout metadata for the second component 208B is not explicitly defined. However, edit-time layout metadata propagation can analyze the configuration of the output dataset 202C which is connected to the fourth output port 204I of the second component 208B to infer the layout metadata for the second component 208B. In the example of FIG. 4A, metadata propagation analyzes the configuration of the output dataset 202C and determines that it is configured receive data from two parallel-executing instances of its upstream component (i.e., the second component 208B). Based on the configuration of the output dataset 202C, metadata propagation infers that two instances of the second component 208B execute in parallel (i.e., the second component 208C runs "two ways parallel," denoted as 2× in the figure) during execution of the first dataflow graph 200. Based on this determination, metadata propagation associates the 2× layout metadata with the second component 208B.

Metadata propagation then propagates the 2× layout metadata from the second component 208B to the third flow junction 204G. Since the third flow junction 204G is associated with the second layout metadata parameter having a metadata propagation direction of "inward," the layout metadata 2× is not propagated any further and is maintained at the third flow junction 204G for later use in link-time metadata resolution.

It is noted that since a file, which already has layout metadata, is connected to the first flow junction 204D in the first dataflow graph 200, no layout metadata propagation occurs through the first flow junction 204D.

Referring to FIG. 4B, while the graph developer is editing the second dataflow graph 201, edit-time layout metadata propagation is performed on the second dataflow graph 201. The third component 208C included in the second dataflow graph 201 has explicitly defined layout metadata indicating that, during execution of the second dataflow graph 201, one instance of the third component 208C runs (denoted as 1× in the figure). The layout metadata for the fourth component 208D included in the second dataflow graph 201 is not explicitly defined and is therefore defined by metadata propagation.

Since the second flow junction 204F is associated with the first layout metadata parameter having a metadata propagation direction of "outward," the 1× layout metadata for the third component 208C is propagated to the second flow junction 204F where it is maintained for later use in the link-time metadata resolution stage.

Since the layout metadata for the fourth component 208D is not explicitly defined, it is expected that its layout metadata will be propagated from the third flow junction 204G which is associated with the second layout metadata parameter having a metadata propagation direction of "inward." However, the layout metadata associated with the third flow junction 204G is unknown at edit time in the second dataflow graph 201 and is expected to be provided by the container graph at link-time. For this reason, placeholder layout metadata $TBD_2$ is propagated to and temporarily associated with the fourth component 208D. The placeholder layout metadata is maintained at the fourth component 208D until link-time metadata resolution resolves the actual value of $TBD_2$ and associates that actual value as the layout metadata for the fourth component 208D.

Referring to FIG. 4C, just before run-time, the second dataflow graph 201 is linked into the first dataflow graph 200 resulting in the combined dataflow graph 300 and link-time metadata resolution is performed. To perform link-time metadata resolution, the layout metadata parameters associated with each of the flow junctions of the sub-graph interface 210 are analyzed to determine the direction of metadata propagation associated with each of the flow junctions. For flow junctions of the sub-graph interface 210 having a metadata propagation direction of "inward," layout metadata which is maintained at the flow junctions in the first dataflow graph 200 is transferred inward to the appropriate components of the second dataflow graph 201. Similarly, for ports of the sub-graph interface 210 having a metadata propagation direction of "outward," layout metadata which is maintained at the flow junctions in the second dataflow graph 201 is transferred outward to the appropriate components of the first dataflow graph 200.

In particular, the first layout metadata parameter associated with the second flow junction 204F is analyzed and it is determined that the second flow junction 204F has a metadata propagation direction of "outward." It is then determined that the second flow junction 204F is associated with explicitly defined layout metadata (i.e., 1×) in the second dataflow graph 201 and with placeholder layout metadata $TBD_1$ in the first dataflow graph 200. The link-time metadata resolution stage associates all components associated with $TBD_1$ in the first dataflow graph 200 (i.e., the first component 208A) with layout metadata 1×.

The second layout metadata parameter associated with the third flow junction 204G is analyzed and it is determined that the third flow junction 204G has a metadata propagation direction of "inward." It is then determined that the third flow junction 204G is associated with placeholder layout metadata $TBD_2$ in the second dataflow graph 201 and with explicitly defined layout metadata (i.e., 2×) in the first dataflow graph 200. Link-time metadata resolution associates all components associated with $TBD_2$ in the second dataflow graph 201 (i.e., the fourth component 208D) with layout metadata 2×.

As a result of the above-described edit-time metadata propagation and link-time metadata resolution processes, all of the components in the combined dataflow graph 300 are associated with valid layout metadata.

In some of the examples described above, metadata propagation is described as an operation which copies explicitly defined metadata associated with a given port, terminal, or component to another port, terminal, or component which is has undefined metadata. The copied metadata is then associated with the other port, terminal, or component.

However, in some examples, rather than copying metadata, metadata propagation uses pointers to indicate associations between ports, terminals, or components with explicitly defined metadata and those with undefined metadata. For example, a given port with undefined metadata may have a metadata pointer which metadata propagation assigns to explicitly defined metadata associated with another, different port. At link-time no further propagation occurs. Instead, the pointer resolves causing the explicitly defined metadata to be associated with the other, different port.

6 APPLICATIONS

In some examples, a given sub-graph interface can be associated with a library of implementation sub-graphs which conform to the sub-graph interface. A graph developer who places the sub-graph interface into a container graph can then easily choose from any of the implementation sub-graphs in the library during development.

In some examples, use of the sub-graph interfaces described above facilitates abstraction of code. For example, a given implementation of a sub-graph interface may exist in only one place on disk but may be used in many container graphs. Changes made to the implementation on disk affect the functionality of all of the container graphs where the implementation is used without requiring any modification to the container graphs.

7 ALTERNATIVES

In some examples, certain implementation sub-graphs are encrypted such that unauthorized users can not inspect the contents of the sub-graphs. In such examples, the sub-graph interface is capable of linking the encrypted implementation sub-graphs. In some examples, certain container graphs are encrypted such that unauthorized users can not inspect the contents of the container graphs.

In some examples, each flow junction of a graph interface includes one or more of the following properties: a label, a dataflow direction, an indication of whether the flow junction fan-in or fan-out, an indication of whether the flow junction is required, a metadata propagation direction, and a name of an associated layout metadata parameter.

In some examples, a designer of a sub-graph interface can specify a rule defining a metadata relationship between two or more flow junctions of the sub-graph interface. For example, the sub-graph interface designer can specify that an input flow junction and an output flow junction have the same metadata.

In some examples, the sub-graph interface can be implemented such that it supports multi-phase sub-graph implementations. Very-generally, a multi-phase graph is a graph which has its components separated into two or more "phases" which execute sequentially in a predefined order. For example, a multi-phase graph may include three phases: a first phase, a second phase, and a third phase, each including one or more components. In operation, the components of the second phase do not begin processing data until the components of the first phase complete their processing. Similarly, the components of the third phase do not begin processing data until the components of the second phase complete their processing.

To accommodate dynamic sub-graphs with multiple phases, the sub-graph interface includes a parameter that allows the designer of the sub-graph interface to specify whether the sub-graph interface is single phase or multi-phase. In the case that the sub-graph interface is specified as multi-phase, the designer does not need to specify a fixed number of phases for the sub-graph interface.

An example of requirements for implementations of a sub-graph interface that has been specified as multi-phase include the following requirements. Any implementation of the sub-graph interface must have all components connected to the input ports (or flow junctions) of the sub-graph interface in a single phase, $\varphi i$. Furthermore, any implementation of the sub-graph interface must have all components connected to the output ports (or flow junctions) of the sub-graph interface in a single phase, $\varphi o > \varphi i$, where $\varphi o$ is the maximum phase in the implementation. Implementations of the sub-graph interface may have any number of phases that are purely internal to the sub-graph implementation.

When a container graph including a multi-phase sub-graph interface is being edited, the phase at the output of the sub-graph implementation is temporarily assumed to be its input phase+1. This is sufficient for graph developers to determine when downstream components will be in the same phase. However the edit-time phases are not necessarily the same as the run-time phases.

When the implementation sub-graph is bound in place of the sub-graph interface, the overall phase information for the combined graph is updated as follows:

1) For a given sub-graph implementation, let I be the maximum of the phases of components writing to its input flow junctions. For all multi-phase sub-graph implementations at a given input phase value I, compute M, which is the maximum over the number of purely internal phases in the multi-phase sub-graph implementations.
2) The phase of all components in the graph with phase greater than 1 is incremented by M, and the phase deltas are propagated downstream.
3) The output phase O of a sub-graph implementation is set to the minimum of the adjusted phases of the set of downstream components of the sub-graph implementation's output ports.
4) This process is repeated for each phase in the combined graph which contains one or more multi-phase sub-graph implementations.

If $\varphi i$, the input phase in the sub-graph implementation, is not 0 then some number m>0 of the internal phases occur before the first input phase in the sub-graph implementation. These "pre-phases" of the sub-graph implementation are useful, for example, for creating a lookup file to be used in the main input processing. In this case, if I<$\varphi i$, the global phase of all components may need to be incremented so that the m pre-phases can be run at positive phase numbers in the combined dataflow graph. This can carried out in a phase by phase manner, incrementing by the maximum of the pre-phases of all sub-graph implementations in the starting phase I (before the adjustment), propagating the phase deltas downstream, and iterating for the next phase.

In some examples, the above adjustment algorithm may result in gaps in the phase numbering of components in a sub-graph implementation (e.g., if there were other sub-graph implementations with internal phases in the same input phase as the sub-graph implementation). For example, consider two sub-graph implementations in an input phase 0: A, with 2 internal phases; and B, with one internal phase. The phase of the next downstream components of A and B is at least 1, since they are multi-phase graph implementations. The max of the internal phase counts is 2, and so the adjusted global output phase of both A and B is be 3. This means B will include a phase gap—its input phase will be 0, its only purely internal phase will be 1, but its output phase will be 3. Such a phase gap is not detrimental to the operation of the dataflow graph.

In some examples, purely internal phases of multiple sub-graph implementations in the same input phase, I, will overlap with each other. This can be problematic due to resource constraints and it is preferable that the sub-graph implementation has a private space of internal phases. For this reason, it is possible to allow a sub-graph implementation to opt out of sharing its internal phases with other sub-graph implementations. This can be done, for example, using a local parameter on the on the sub-graph implementation (e.g., named private_internal_phasing) that can be resolved to a Boolean value. When true, the computation of M in step 1 above is altered to be the sum of the internal phases of the sub-graph implementations at input phase I with private_internal_phasing set to True, added to the maximum of the internal phase count of the remaining sub-graph implementations at input phase I.

In some examples, the sub-graph interface may not have any flow terminals, but may still be useful for allowing a user to define different sets of resources (e.g., lookup files) to be used by a particular container graph, depending on which sub-graph implementation is loaded.

In some examples, the sub-graph interface is implemented by using a simple textual specification of the interface rather than by using a graphical user interface.

In some examples, the implementation of a sub-graph interface is simplified using a "wizard" style graphical user interface. For example, the wizard style graphical user interface would lead a user through the implementation of the sub-graph interface by asking a series of questions and automatically generating the sub-graph interface based on the user's answers. In one example, the wizard style graphical user interface includes a number of pages including but not limited to a pre-flight check page (i.e., an introduction page), a file names and locations page, a parameter definition page, a flow junction definition and metadata propagation page, a layout metadata page, and a summary page.

8 SYSTEM CONFIGURATIONS

The approaches for managing sub-graphs and sub-graph interfaces described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for specifying a dataflow graph, the method including:
    rendering, in a first user interface, a representation of a first dataflow graph, the rendering including:
        rendering a plurality of components of the first dataflow graph, at least one component that represents a computation associated with at least one of data flowing into an input port or data flowing out of an output port, and
        establishing a relationship between an output port of a first component of the first dataflow graph and an input port of a second component of the first dataflow graph, based on first user input indicating a flow of data from the output port of the first component to the input port of the second component; and
    rendering, in a second user interface, a representation of a sub-graph of the first dataflow graph, the rendering including:
        rendering at least one sub-graph interface, the sub-graph interface including two or more flow junctions, which each define a connection between a first flow of data to an input port and a second flow of data from an output port, where the first flow and the second flow are generated as a single flow during execution of the first dataflow graph, and where a first flow junction of the sub-graph interface represents a connection between: (1) a flow of data outside the sub-graph interface to or from a port of a third component of the first dataflow graph, and (2) a flow of data inside the sub-graph interface to or from a port of a first component of the sub-graph, and
        establishing a relationship between the first flow junction and a second flow junction of the sub-graph interface based on second user input indicating that a first descriptor of a data or computational characteristic associated with the first flow junction of the sub-graph interface is derived from a second descriptor of a data or computational characteristic associated with the second flow junction of the sub-graph interface, where the second user input is different from the first descriptor and the second descriptor, and where the second flow junction represents a connection between: (1) a flow of data outside the sub-graph interface to or from a port of a fourth component of the first dataflow graph, and (2) a flow of data inside the sub-graph interface to or from a port of a second component of the sub-graph.

2. The method of claim 1, further including generating a data structure storing a representation of the first dataflow graph that includes:
    data representing a first set of one or more components that include one or more flows of data connected through one or more flow junctions outside of the sub-graph interface; and data representing a second set of one or more components that include one or more flows of data connected through one or more flow junctions inside of the sub-graph interface.

3. The method of claim 1, wherein the relationship between the first flow junction and the second flow junction corresponds to the first descriptor being identical to the second descriptor.

4. The method of claim 1, wherein the second user interface includes a portion configured to receive a user input that specifies properties of respective flow junctions of a set of defined flow junctions of the sub-graph interface.

5. The method of claim 4, wherein the properties define a direction in which a transfer of a descriptor of a data or computational characteristic associated with a corresponding flow junction will occur.

6. The method of claim 5, wherein the direction corresponds to an inward transfer of a value of a first descriptor of a data or computational characteristic from the first flow junction to the first component of the sub-graph.

7. The method of claim 5, wherein the direction corresponds to an outward transfer of a value of a first descriptor of a data or computational characteristic from the first flow junction to the third component of the first dataflow graph.

8. The method of claim 1, wherein the first descriptor describes a data characteristic of data transferred between the port of the third component of the first dataflow graph and the port of the first component of the sub-graph.

9. The method of claim 8, wherein the data characteristic includes a format of fields of records within the transferred data.

10. The method of claim 1, wherein the descriptor describes a computational characteristic of at least one of the third component of the first dataflow graph or the first component of the sub-graph.

11. The method of claim 10, wherein the computational characteristic includes a degree of parallelism of execution of a computation represented by the third component of the first dataflow graph or the first component of the sub-graph.

12. The method of claim 1, wherein the first user interface is generated by a first computing system.

13. The method of claim 12, wherein the second user interface is generated by a second computing system different from the first computing system.

14. Software stored in a non-transitory form on a computer-readable medium, for specifying a dataflow graph, the software including instructions for causing a computing system to:
  render, in a first user interface, a representation of a first dataflow graph, the rendering including:
    rendering a plurality of components of the first dataflow graph, at least one component that represents a computation associated with at least one of data flowing into an input port or data flowing out of an output port, and
    establishing a relationship between an output port of a first component of the first dataflow graph and an input port of a second component of the first dataflow graph, based on first user input indicating a flow of data from the output port of the first component to the input port of the second component; and
  render, in a second user interface, a representation of a sub-graph of the first dataflow graph, the rendering including:
    rendering at least one sub-graph interface, the sub-graph interface including two or more flow junctions, which each define a connection between a first flow of data to an input port and a second flow of data from an output port, where the first flow and the second flow are generated as a single flow during execution of the first dataflow graph, and where a first flow junction of the sub-graph interface represents a connection between: (1) a flow of data outside the sub-graph interface to or from a port of a third component of the first dataflow graph, and (2) a flow of data inside the sub-graph interface to or from a port of a first component of the sub-graph, and
    establishing a relationship between the first flow junction and a second flow junction of the sub-graph interface based on second user input indicating that a first descriptor of a data or computational characteristic associated with the first flow junction of the sub-graph interface is derived from a second descriptor of a data or computational characteristic associated with the second flow junction of the sub-graph interface, where the second user input is different from the first descriptor and the second descriptor, and where the second flow junction represents a connection between: (1) a flow of data outside the sub-graph interface to or from a port of a fourth component of the first dataflow graph, and (2) a flow of data inside the sub-graph interface to or from a port of a second component of the sub-graph.

15. A computing system for specifying a dataflow graph, the computing system including:
  a first computing device, including at least one processor, configured to render, in a first user interface, a representation of a first dataflow graph, the rendering including:
    rendering a plurality of components of the first dataflow graph, at least one component that represents a computation associated with at least one of data flowing into an input port or data flowing out of an output port, and
    establishing a relationship between an output port of a first component of the first dataflow graph and an input port of a second component of the first dataflow graph, based on first user input indicating a flow of data from the output port of the first component to the input port of the second component; and
  a second computing device configured to render, in a second user interface, a representation of a sub-graph of the first dataflow graph, the rendering including:
    rendering at least one sub-graph interface, the sub-graph interface including two or more flow junctions, which each define a connection between a first flow of data to an input port and a second flow of data from an output port, where the first flow and the second flow are generated as a single flow during execution of the first dataflow graph, and where a first flow junction of the sub-graph interface represents a connection between: (1) a flow of data outside the sub-graph interface to or from a port of a third component of the first dataflow graph, and (2) a flow of data inside the sub-graph interface to or from a port of a first component of the sub-graph, and
    establishing a relationship between the first flow junction and a second flow junction of the sub-graph interface based on second user input indicating that a first descriptor of a data or computational characteristic associated with the first flow junction of the sub-graph interface is derived from a second descriptor of a data or computational characteristic associated with the second flow junction of the sub-graph interface, where the second user input is different from the first descriptor and the second descriptor, and where the second flow junction represents a connection between: (1) a flow of data outside the sub-graph interface to or from a port of a fourth component of the first dataflow graph, and (2) a flow of data inside the sub-graph interface to or from a port of a second component of the sub-graph.

16. A computing system for specifying a dataflow graph, the computing system including:
   means for rendering, in a first user interface, a representation of a first dataflow graph, the rendering including:
      rendering a plurality of components of the first dataflow graph, at least one component that represents a computation associated with at least one of data flowing into an input port or data flowing out of an output port, and
      establishing a relationship between an output port of a first component of the first dataflow graph and an input port of a second component of the first dataflow graph, based on first user input indicating a flow of data from the output port of the first component to the input port of the second component; and
   means for rendering, in a second user interface, a representation of a sub-graph of the first dataflow graph, the rendering including:
      rendering at least one sub-graph interface, the sub-graph interface including two or more flow junctions, which each define a connection between a first flow of data to an input port and a second flow of data from an output port, where the first flow and the second flow are generated as a single flow during execution of the first dataflow graph, and where a first flow junction of the sub-graph interface represents a connection between: (1) a flow of data outside the sub-graph interface to or from a port of a third component of the first dataflow graph, and (2) a flow of data inside the sub-graph interface to or from a port of a first component of the sub-graph, and
      establishing a relationship between the first flow junction and a second flow junction of the sub-graph interface based on second user input indicating that a first descriptor of a data or computational characteristic associated with the first flow junction of the sub-graph interface is derived from a second descriptor of a data or computational characteristic associated with the second flow junction of the sub-graph interface, where the second user input is different from the first descriptor and the second descriptor, and where the second flow junction represents a connection between: (1) a flow of data outside the sub-graph interface to or from a port of a fourth component of the first dataflow graph, and (2) a flow of data inside the sub-graph interface to or from a port of a second component of the sub-graph.

17. The method of claim 1, wherein the first flow and second flow are generated as a single flow during execution of the first dataflow graph after the sub-graph of the first dataflow graph is dynamically linked to the first dataflow graph.

18. The method of claim 1, wherein establishing the relationship between the first flow junction and the second flow junction includes rendering a link between the first flow junction and the second flow junction.

19. The method of claim 1, wherein the user input on which the relationship between the first flow junction and the second flow junction is based includes a line drawn from the first flow junction to the second flow junction.

20. The software of claim 14, further including instructions for causing a computing system to generate a data structure storing a representation of the first dataflow graph that includes:
   data representing a first set of one or more components that include one or more flows of data connected through one or more flow junctions outside of the sub-graph interface; and
   data representing a second set of one or more components that include one or more flows of data connected through one or more flow junctions inside of the sub-graph interface.

21. The software of claim 14, wherein the relationship between the first flow junction and the second flow junction corresponds to the first descriptor being identical to the second descriptor.

22. The software of claim 14, wherein the second user interface includes a portion configured to receive a user input that specifies properties of respective flow junctions of a set of defined flow junctions of the sub-graph interface.

23. The software of claim 22, wherein the properties define a direction in which a transfer of a descriptor of a data or computational characteristic associated with a corresponding flow junction will occur.

24. The software of claim 23, wherein the direction corresponds to an inward transfer of a value of a first descriptor of a data or computational characteristic from the first flow junction to the first component of the sub-graph.

25. The software of claim 23, wherein the direction corresponds to an outward transfer of a value of a first descriptor of a data or computational characteristic from the first flow junction to the third component of the first dataflow graph.

26. The software of claim 14, wherein the first descriptor describes a data characteristic of data transferred between the port of the third component of the first dataflow graph and the port of the first component of the sub-graph.

27. The software of claim 26, wherein the data characteristic includes a format of fields of records within the transferred data.

28. The software of claim 14, wherein the descriptor describes a computational characteristic of at least one of the third component of the first dataflow graph or the first component of the sub-graph.

29. The software of claim 28, wherein the computational characteristic includes a degree of parallelism of execution of a computation represented by the third component of the first dataflow graph or the first component of the sub-graph.

30. The software of claim 14, wherein the first user interface is generated by a first computing system.

31. The software of claim 30, wherein the second user interface is generated by a second computing system different from the first computing system.

32. The software of claim 14, wherein the first flow and the second flow are generated as a single flow during execution of the first dataflow graph after the sub-graph of the first dataflow graph is dynamically linked to the first dataflow graph.

33. The software of claim 14, wherein establishing the relationship between the first flow junction and the second flow junction includes rendering a link between the first flow junction and the second flow junction.

34. The software of claim 14, wherein the user input on which the relationship between the first flow junction and the second flow junction is based includes a line drawn from the first flow junction to the second flow junction.

35. The computing system of claim 15, further configured to generate a data structure storing a representation of the first dataflow graph that includes:
   data representing a first set of one or more components that include one or more flows of data connected through one or more flow junctions outside of the sub-graph interface; and
   data representing a second set of one or more components that include one or more flows of data connected through one or more flow junctions inside of the sub-graph interface.

36. The computing system of claim 15, wherein the relationship between the first flow junction and the second flow junction corresponds to the first descriptor being identical to the second descriptor.

37. The computing system of claim 15, wherein the second user interface includes a portion configured to receive a user input that specifies properties of respective flow junctions of a set of defined flow junctions of the sub-graph interface.

38. The computing system of claim 37, wherein the properties define a direction in which a transfer of a descriptor of a data or computational characteristic associated with a corresponding flow junction will occur.

39. The computing system of claim 38, wherein the direction corresponds to an inward transfer of a value of a first descriptor of a data or computational characteristic from the first flow junction to the first component of the sub-graph.

40. The computing system of claim 38, wherein the direction corresponds to an outward transfer of a value of a first descriptor of a data or computational characteristic from the first flow junction to the third component of the first dataflow graph.

41. The computing system of claim 15, wherein the first descriptor describes a data characteristic of data transferred between the port of the third component of the first dataflow graph and the port of the first component of the sub-graph.

42. The computing system of claim 41, wherein the data characteristic includes a format of fields of records within the transferred data.

43. The computing system of claim 15, wherein the descriptor describes a computational characteristic of at least one of the third component of the first dataflow graph or the first component of the sub-graph.

44. The computing system of claim 43, wherein the computational characteristic includes a degree of parallelism of execution of a computation represented by the third component of the first dataflow graph or the first component of the sub-graph.

45. The computing system of claim 15, wherein the first user interface is generated by a first computing system.

46. The computing system of claim 45, wherein the second user interface is generated by a second computing system different from the first computing system.

47. The computing system of claim 15, wherein the first flow and the second flow are generated as a single flow during execution of the first dataflow graph after the sub-graph of the first dataflow graph is dynamically linked to the first dataflow graph.

48. The computing system of claim 15, wherein establishing the relationship between the first flow junction and the second flow junction includes rendering a link between the first flow junction and the second flow junction.

49. The computing system of claim 15, wherein the user input on which the relationship between the first flow junction and the second flow junction is based includes a line drawn from the first flow junction to the second flow junction.

50. A method for specifying a dataflow graph, the method including:
   rendering, in a first user interface, a representation of a first dataflow graph, the rendering including:
      rendering a plurality of components of the first dataflow graph, at least one component that represents a computation associated with at least one of data flowing into an input port or data flowing out of an output port, and
      establishing a relationship between an output port of a first component of the first dataflow graph and an input port of a second component of the first dataflow graph, based on first user input indicating a flow of data from the output port of the first component to the input port of the second component; and
   rendering, in a second user interface, a representation of a sub-graph of the first dataflow graph, the rendering including:
      rendering at least one sub-graph interface, the sub-graph interface including two or more flow junctions, which each define a connection between a first flow of data to an input port and a second flow of data from an output port, where (1) the sub-graph of the first dataflow graph is dynamically linked into the first dataflow graph during dynamic linking that occurs after the rendering of the sub-graph interface, (2) descriptors of data or computational characteristics associated with flow junctions are propagated during metadata propagation within the first dataflow graph that occurs after the dynamic linking, and (3) the first flow and the second flow are generated as a single flow during execution of the first dataflow graph that occurs after the metadata propagation,
      establishing a relationship between the first flow junction and a second flow junction of the sub-graph interface based on second user input received before the dynamic linking, the second user input indicating that a first descriptor of a data or computational characteristic associated with the first flow junction of the sub-graph interface is derived from a second descriptor of a data or computational characteristic associated with the second flow junction of the sub-graph interface, where the second user input is different from the first descriptor and the second descriptor.

51. The method of claim 50, further including rendering, in at least one of the first user interface or the second user interface, a portion configured to receive third user input received before the dynamic linking, the third user input specifying a property of a third flow junction of the sub-graph interface, wherein the specified property defines a direction in which a transfer of a descriptor of a data or computational characteristic associated with a corresponding flow junction will occur during the metadata propagation.

* * * * *